United States Patent
Smith et al.

(10) Patent No.: US 12,435,450 B2
(45) Date of Patent: *Oct. 7, 2025

(54) PITCH COMPOSITIONS FOR SPINNING INTO CARBON ARTICLES AND METHODS RELATING THERETO

(71) Applicant: ExxonMobil Technology and Engineering Company, Annandale, NJ (US)

(72) Inventors: Stuart E. Smith, Easton, PA (US); Madhavi Vadlamudi, Clinton, NJ (US); Clarence E. Chase, Bensalem, PA (US); Robert Panepinto, Freehold, NJ (US)

(73) Assignee: Exxon Mobil Technology and Engineering Company, Spring, TX (US)

( * ) Notice: Subject to any disclaimer, the term of this patent is extended or adjusted under 35 U.S.C. 154(b) by 88 days.

This patent is subject to a terminal disclaimer.

(21) Appl. No.: 18/038,410

(22) PCT Filed: Nov. 10, 2021

(86) PCT No.: PCT/US2021/072318
§ 371 (c)(1),
(2) Date: May 23, 2023

(87) PCT Pub. No.: WO2022/150233
PCT Pub. Date: Jul. 14, 2022

(65) Prior Publication Data
US 2024/0003063 A1    Jan. 4, 2024

Related U.S. Application Data

(60) Provisional application No. 63/134,199, filed on Jan. 6, 2021.

(51) Int. Cl.
*D01F 9/145* (2006.01)
*C08L 95/00* (2006.01)
(Continued)

(52) U.S. Cl.
CPC .............. *D01F 9/145* (2013.01); *C08L 95/00* (2013.01); *C10C 3/002* (2013.01); *C10C 3/06* (2013.01)

(58) Field of Classification Search
CPC . D01F 9/145; D01F 9/15; D01F 9/155; C08L 95/00; C10C 3/002; C10C 3/06
See application file for complete search history.

(56) References Cited

U.S. PATENT DOCUMENTS 3,976,729 A    8/1976  Lewis et al.
3,995,014 A   11/1976  Lewis
(Continued)

FOREIGN PATENT DOCUMENTS

EP        0548918 A1    6/1993
WO     2015/167774 A2   11/2015
(Continued)

OTHER PUBLICATIONS

International Search Report and Written Opinion for International Patent Application No. PCT/US2021/072318 dated Mar. 28, 2022.
(Continued)

*Primary Examiner* — Ellen M McAvoy
(74) *Attorney, Agent, or Firm* — C. Tumey Law Group, PLLC

(57) ABSTRACT

A pitch composition suitable for spinning may comprise: a pitch having a softening point temperature ($T_{sp}$) of 400° C. or less, and an oxidation onset temperature (OOT) at least 10° C. below the $T_{sp}$ at a ramp rate of 10° C./min. A carbon fiber may comprise: a carbon fiber produced from a pitch composition, wherein the pitch composition comprises: a
(Continued)

pitch having a softening point temperature ($T_{sp}$) of 400° C. or less, and an oxidation onset temperature (OOT) at least 10° C. below the $T_{sp}$ at a ramp rate of 10° C./min.

4 Claims, 6 Drawing Sheets

(51) Int. Cl.
*C10C 3/00* (2006.01)
*C10C 3/06* (2006.01)

(56) References Cited

U.S. PATENT DOCUMENTS

| | | |
|---|---|---|
| 4,208,267 A | 6/1980 | Diefendorf et al. |
| 4,927,620 A | 5/1990 | Ward et al. |
| 6,241,923 B1* | 6/2001 | Sakai ............... D01F 9/145 |
| | | 264/29.7 |
| 7,138,047 B2 | 11/2006 | Stell et al. |
| 7,820,035 B2 | 10/2010 | McCoy et al. |
| 8,684,384 B2 | 4/2014 | Spicer et al. |
| 9,206,363 B2 | 12/2015 | Woo et al. |
| 10,400,184 B2 | 9/2019 | Woo et al. |
| 2020/0299587 A1* | 9/2020 | Atkins ............... C10B 53/04 |
| 2021/0261868 A1* | 8/2021 | Atkins ............... C10C 3/002 |
| 2023/0416949 A1* | 12/2023 | Smith ............... D01F 9/145 |
| 2024/0018418 A1* | 1/2024 | Smith ............... C10C 3/002 |
| 2024/0068132 A1* | 2/2024 | Gopinadhan ........... C10C 3/005 |

FOREIGN PATENT DOCUMENTS

| | | |
|---|---|---|
| WO | 2019/014010 A1 | 1/2019 |
| WO | 2022150232 A1 | 7/2022 |

OTHER PUBLICATIONS

Canadian Office Action for CA Patent Application No. 3,199,833 dated Jun. 7, 2024. PDF file. 4 pages.

International Preliminary Report on Patentability for International Patent Application No. PCT/US2021/072318 dated Jul. 4, 2024. PDF file. 7 pages.

* cited by examiner

… (1)

PITCH COMPOSITIONS FOR SPINNING INTO CARBON ARTICLES AND METHODS RELATING THERETO

FIELD OF THE INVENTION

The present disclosure relates to pitch compositions and methods for their production and use. Furthermore, the present disclosure relates to pitch compositions suitable for spinning into carbon fibers with improved stabilization capability.

BACKGROUND OF THE INVENTION

In recent years, the carbon fiber industry has been growing steadily to meet the demand from a wide range of industries such as textiles, automotive, aerospace, high performance aquatic vessels, airplanes, sports equipment, construction, military, wind energy industries, energy storage applications, fireproof materials, carbon-carbon composites, carbon fibers, and in many insulating and sealing materials used in construction and road building, turbine blades, light weight cylinders and pressure vessels, off-shore tethers and drilling risers, medical, for example. The non-limiting foregoing properties of the carbon fibers make such material suitable for high performance applications: high bulk modulus and tensile modulus (depending on the morphology of the carbon fiber), high electrical and thermal conductivities, etc. Thus, carbon fibers have become an important reinforcing material in advanced composites. However, the high cost of carbon fiber limits its applications and widespread use, in spite of the remarkable properties exhibited by such material. Hence, developing low-cost technologies has been a major challenge for researchers and key manufacturers.

Carbon fiber can be produce from a pitch, which can be derived from petroleum, coal tar, biomass tar, or from an acid-catalyzed oligomerization of small molecules (e.g., naphthalene), for example. The production of carbon fiber can be achieved as follows: melt spinning; stabilization; carbonization; and graphitization. During a melt spinning process, the pitch is heated to sufficiently high temperatures to melt the pitch and reduce its viscosity so that the heated pitch can pass through a spinneret. The resulting carbon fiber produced from a pitch may then be wound on a spinning spool, or laid into a fibrous material. A pitch is considered suitable for spinning based on a number of different requirements that must be satisfied. Non-limiting examples of such requirements are: a) a softening point ($T_{sp}$) sufficiently low to enable melt spinning without chemical degradation; b) low volatiles to minimize the carbon fiber breakage during spinning; c) spinnability of a pitch into carbon fibers; d) a pitch possessing enough mesophase to produce a fiber with the desired modulus; and e) sufficient reactivity of the pitch for optimal stabilization in air, or other reactive media, below its softening point.

Particularly, the stabilization process of the carbon fibers is one of the most critical process in the production of high-quality, and low-cost, carbon fibers. The relationship between the stabilization conditions and the mechanical properties of the carbonized fiber is significant as the stabilization process chemically alters spun fibers at the atomic level prior to carbonizing. Many factors affect the stabilization process including the nature of the pitch, the temperature, the gaseous environment, and time. Thus, there is still a need for identifying optimum stabilization conditions of carbon fibers.

Accordingly, a method capable of evaluating and establishing pitch compositional properties directly relevant to the spinning and the stabilization processes, as well as enabling the production of pitch compositions with tailored properties for good stabilization, is highly desired.

SUMMARY OF THE INVENTION

The present disclosure relates to pitch compositions and methods for their production and use. Furthermore, the present disclosure relates to pitch compositions suitable for spinning into carbon fibers with improved stabilization capability.

A pitch composition of the present disclosure suitable for spinning may comprise: a pitch having a softening point temperature ($T_{sp}$) of 400° C. or less, and an oxidation onset temperature (OOT) at least 10° C. below the $T_{sp}$ at a ramp rate of 10° C./min.

A carbon fiber of the present disclosure may comprise: a carbon fiber produced from a pitch composition, wherein the pitch composition comprises: a pitch having a softening point temperature ($T_{sp}$) of 400° C. or less, and an oxidation onset temperature (OOT) at least 10° C. below the $T_{sp}$ at a ramp rate of 10° C./min.

A carbon fiber composite of the present disclosure may comprise: a matrix material; and a carbon fiber produced from a pitch composition, wherein the pitch composition comprises: a pitch having a softening point temperature ($T_{sp}$) of 400° C. or less, and an oxidation onset temperature (OOT) at least 10° C. below $T_{sp}$ at a ramp rate of 10° C./min.

A process of the present disclosure may comprise: providing a pitch having a softening point temperature ($T_{sp}$) of 400° C. or less, and an oxidation onset temperature (OOT) at least 10° C. below $T_{sp}$; spinning the pitch to produce a carbon fiber; and stabilizing the carbon fiber in the presence of air, or other reactive gas, to produce a stabilized carbon fiber by heating the carbon fiber to a temperature that is at least 10° C. below the $T_{sp}$ of the pitch.

A process of the present disclosure may comprise: introducing a hydrocarbon feed to one or more reaction zones to produce a reaction effluent, wherein the reaction effluent is directed to one or more separation zones that fractionates the reaction effluent to produce a pitch product, wherein the pitch product has a $T_{sp}$ greater than the $T_{sp}$ of the hydrocarbon feed and an OOT at least 10° C. below the $T_{sp}$ of the pitch product, at a ramp rate of 10° C./min.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION OF THE INVENTION

Figure 1:
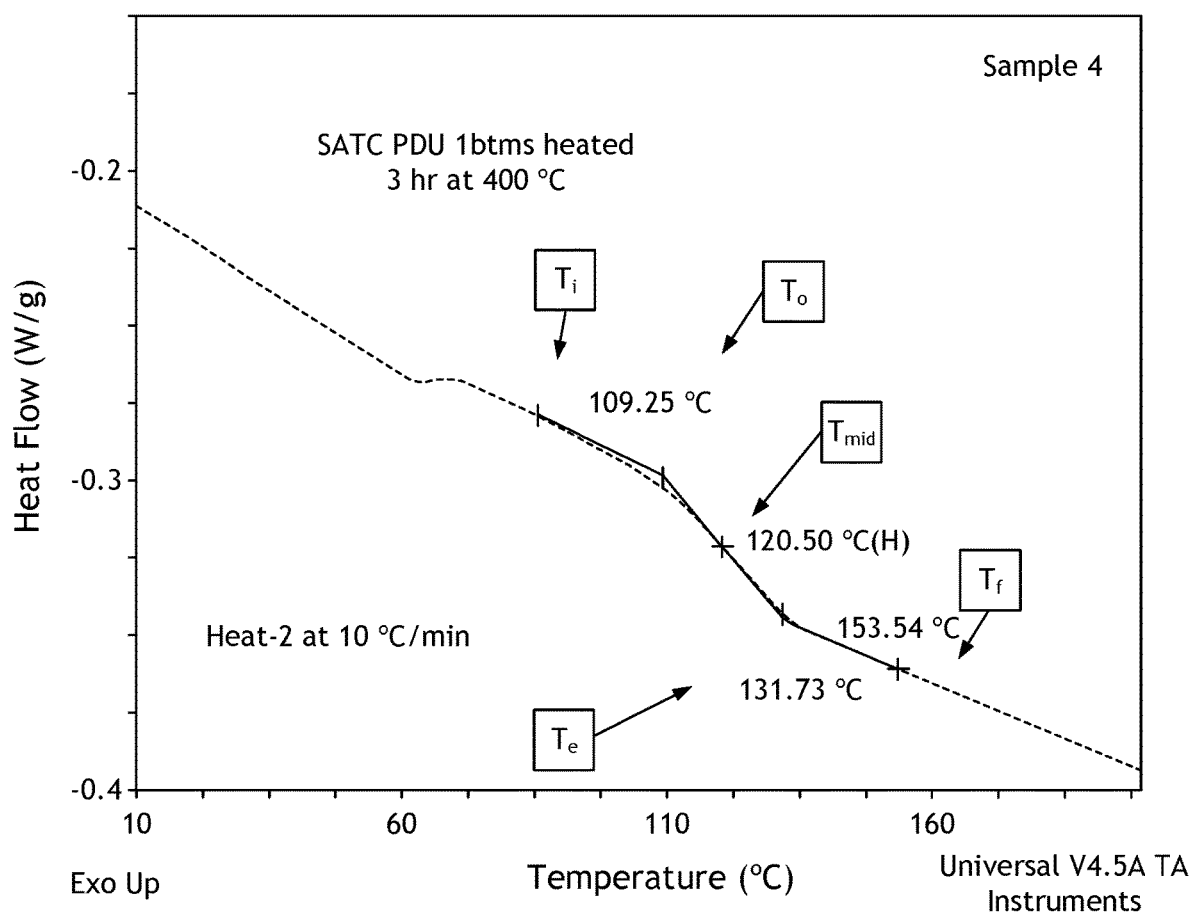
FIG. 1 is a differential scanning calorimetry (DSC) curve of heat flow (W/g) versus the temperature (° C.) of a pitch, under air.

The present disclosure relates to pitch compositions and methods for their production and use. Furthermore, the present disclosure relates to pitch compositions suitable for spinning into carbon fibers with improved stabilization capability.

Embodiments of the present disclosure include pitch compositions suitable for spinning comprising a pitch having a softening point temperature ($T_{sp}$) of 400° C. or less, and an oxidation onset temperature (OOT) at least 10° C. below $T_{sp}$, at a ramp rate of 10° C./min. As used herein, "softening point" ($T_{sp}$) refers to a temperature or a range of temperatures at which a material softens. Herein, the softening point is measured using a METTLER TOLEDO dropping point instrument, such as METTLER TOLEDO DP70, according to a procedure analogous to ASTM D3104. For pitches with softening points greater than 180° C., the measurement was performed under a nitrogen blanket.

Advantageously, such compositions provide improved stabilization for carbon fibers production, and enhancement of tensile strength, and tensile modulus, for example. Such compositions may further provide improved spinning. Because of these improved properties, the pitch compositions described herein may be useful in producing higher quality carbon articles. Furthermore, determining which pitch compositions have the desired difference ($T_{sp}$-OOT) enables determination of whether a pitch composition is suitable for spinning and, whether the corresponding carbon fiber produced from the said pitch composition can be efficiently stabilized. When the difference ($T_{sp}$-OOT) value is negative, that would indicate that the fiber will melt before it reacts with air for stabilization. When the difference ($T_{sp}$-OOT) is positive, that would indicate that the pitch is capable of reacting at temperatures below its softening point. Alternatively, if the kinetics of stabilization are determined by varying the temperature ramp rates, it may be possible to calculate apparent rate constants ($k_{app}$) at different temperatures, which permits evaluation of apparent rate constants relative to the pitch softening point ($T-T_{sp}$).

As used herein, "onset oxidation temperature" is a relative measure of the degree of oxidative stability of a material evaluated at a given heating rate and oxidative environment, for example, oxygen; the higher the OOT value the more stable the material. The OOT can be measured by a DSC technique. Several test methods can be used for determining the oxidative properties of hydrocarbons by DSC, or pressure differential scanning calorimetry (PDSC), under linear heating rate conditions and can be applicable to hydrocarbons, which oxidize exothermically in their analyzed form. Herein, the OOT is measured according to the ASTM E2009 standard test method.

The present disclosure also relates to the methods for making carbon fibers produced from the foregoing pitch compositions comprising a pitch having a softening point temperature ($T_{sp}$) of 400° C. or less, and an oxidation onset temperature (OOT) at least 10° C. below the pitch softening point, $T_{sp}$ at a ramp rate of 10° C./min. The methods for making carbon fibers produced from the foregoing pitch compositions comprise spinning a single pitch, a combination of two pitches, or blends of at least two pitches, to produce a carbon fiber comprised of the foregoing pitch; and stabilizing the carbon fiber in the presence of air, or other reactive substrate, to produce a stabilized carbon fiber by heating the carbon fiber to a temperature that is below the $T_{sp}$ of the pitch, and in the range of OOT−50° C. and OOT+100° C. Alternatively, the kinetics of stabilization may be estimated by varying the temperature ramp rate and determining the OOT for the respective temperature. Fitting the data to an assumed first order reaction produces activation parameters that can be used to estimate the apparent rate constant ($k_{app}$) at a series of temperatures. The apparent rate constant ($k_{app}$) at the pitch's softening point can be determined ($T-T_{sp}=0$). The present disclosure also relates to methods for making carbon fibers produced from the foregoing pitch compositions comprising a pitch having a softening point temperature ($T_{sp}$) of 400° C. or less, and an apparent rate constant ($k_{app}$) at $T_{sp}$ ($T-T_{sp}=0$) greater than $1 \times 10^{-03}$ s$^{-1}$.

The present disclosure also relates to processes comprising: providing a pitch having a softening point temperature ($T_{sp}$) of 400° C. or less, and an oxidation onset temperature (OOT) at least 10° C. below $T_{sp}$ at a ramp rate of 10° C./min; spinning the pitch to produce a carbon fiber; and stabilizing the carbon fiber in the presence of air, or other reactive substrate, to produce a stabilized carbon fiber by heating the carbon fiber to a temperature that is at least 10° C. below the $T_{sp}$ of the pitch. The pitch may have a mesophase content of 5 vol % or less, based on the total volume of the pitch. Alternately, the pitch may have a mesophase content of 5 vol % to 100 vol %, based on the total volume of the pitch. Further, the pitch may have an extensional viscosity of from 5 Pa·s to 500,000 Pa·s at an extensional strain rate ranging from 0 to 100 s$^{-1}$. The pitch may have an apparent rate constant ($k_{app}$) for oxidation under air greater than 0.001 s$^{-1}$ at $T-T_{sp} \leq 0°$ C. In at least one embodiment, the pitch has an extensional viscosity of from 5 Pa·s to 500,000 Pa·s at spinning temperature, and/or at an extensional strain rate ranging from 0 to 100 s$^{-1}$.

The present disclosure also relates to processes comprising: introducing a hydrocarbon feed to one or more reaction zones to produce a reaction effluent, wherein the reaction effluent can be directed to one or more separation zones that fractionates the reaction effluent to yield a pitch product, wherein the pitch product may have a $T_{sp}$ greater than the $T_{sp}$ of the hydrocarbon feed, and an OOT at least 10° C. below the pitch $T_{sp}$, at a ramp rate of 10° C./min. The hydrocarbon feed may be selected from the group consisting of: crude oil, fluid catalytic cracking (FCC) main column bottoms (MCB), steam cracker tar, hydrotreated MCB, hydrotreated steam cracker tar, vacuum residue, atmospheric residue, reformate, naphthalene, coal tar, coal tar pitch, vacuum gas oil, distillate, petroleum pitch, or hydrotreated versions of any of the aforementioned streams. The separation zone may consist of a flash drum, distillation tower, chromatographic separation, membrane-filtration, or deasphaltenation. The reaction zone may consist of a fixed-bed reactor, slurry reactor, tubular reactor, continuous stirred-tank reactor, batch reactor, or semi-batch reactor. The pitch may have a $T_{sp}$ in the range of 100° C. to 400° C. Further, the pitch may have a mesophase content of about 5 vol % or greater. Alternately, the pitch may have a mesophase content of less than 5 vol %.

Said carbon fibers may be useful in woven or molded products to improve the strength, stiffness, electrical conductivity, and thermal conductivity of the article. In addition to fiber products, the carbon fibers may be incorporated into a polymer matrix to create molded or printed products. Fibers and other carbon products are discussed in more detail below.

Definitions and Test Methods

The new notation for the Periodic Table Groups is used as described in Chemical and Engineering News, 63(5), 27 (1985).

All numerical values within the detailed description and the claims herein are modified by "about" or "approximately" with respect to the indicated value, and take into account experimental error and variations that would be expected by a person having ordinary skill in the art. Unless otherwise indicated, ambient temperature (room temperature) is from about 18° C. to about 20° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

Where the term "between" is used herein to refer to ranges, the term encompasses the endpoints of the range. That is, "between 2% and 10%" refers to 2%, 10% and all percentages between those terms.

Numerical ranges used herein include the numbers recited in the range. For example, the numerical range "from 1 wt % to 10 wt %" includes 1 wt % and 10 wt % within the recited range and all points within the range.

The term "independently," when referenced to selection of multiple items from within a given Markush group, means that the selected choice for a first item does not necessarily influence the choice of any second or subsequent item. That is, independent selection of multiple items within a given Markush group means that the individual items may be the same or different from one another.

The following abbreviations are used herein: DSC is differential scanning calorimetry; TGA is thermal gravimetric analysis; $T_g$ is glass transition temperature, $T_{sp}$ is softening point temperature; OOT is oxidation onset temperature; MCRT is microcarbon residue test; RPM is rotation per minute; Pa s is Pascal-second; W/g is watt per gram; wt % is weight percent; mol % is mole percent; vol % is volume percent; psig is pounds per square in gauge; WHSV is weight hourly space velocity.

The "microcarbon residue test", also referred to as "MCRT", is a standard test method for the determination of carbon residue (micro method). The carbon residue value of the various petroleum materials serves as an approximation of the tendency of the material to form carbonaceous type deposits under degradation conditions similar to those used in the test method, and can be useful as a guide in manufacture of certain stocks. However, care needs to be exercised in interpreting the results. This test method covers the determination of the amount of carbon residue formed after evaporation and pyrolysis of petroleum materials under certain conditions and is intended to provide some indication of the relative coke forming tendency of such materials. Herein, the MCRT is measured according to the ASTM D4530-15 standard test method.

The term "blend" as used herein refers to a mixture of two or more pitches. Blends may be produced by, for example, solution blending, melt mixing in a heated mixer, physically blending a pitch in its liquid state and a different pitch in its solid state, or physically blending the pitches in their solid forms. Suitable solvents for solution blending can include benzene, toluene, naphthalene, xylenes, pyridine, quinoline, aromatic cuts from refining, or chemicals processes such as decant oil, reformate, tar distillation cuts, and so on. Solution blending, solid state blending, and/or melt blending may occur at a temperature of from about 20° C. to about 400° C.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the present disclosure embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" or "having" various components or steps, the compositions and methods can also "consist essentially of" or "consist of" the various components and steps.

Pitch Compositions

As used herein, the term "pitch" refers to a high-boiling complex mixture of mainly aromatic and alkyl-substituted aromatic compounds that are glassy materials at ambient temperature and have a softening point above 50° C. These aromatic compounds are primarily hydrocarbons, but heteroatoms and traces of metals can be present within these materials. When cooled from a melt, a pitch can solidify without crystallization. Pitches may include petroleum pitches, coal tar pitches, natural asphalts, pitches contained as by-products in the naphtha cracking industry, pitches of high carbon content obtained from petroleum asphalt and other substances having properties of pitches produced as products in various industrial production processes. Pitches exhibit a broad softening temperature range and are typically derived from petroleum, coal tar, plants, or catalytic oligomerization of small molecules (e.g., acid-catalyzed oligomerization). A pitch can also be referred to as tar, bitumen, or asphalt. When a pitch is produced from plants, it is also referred to as resin. Various pitches may be obtained as products in the gas oil or naphtha cracking industry as a carbonaceous residue consisting of a complex mixture of primarily aromatic organic compounds, which are solid at room temperature, and exhibit a relatively broad softening temperature range. Hence, a pitch can be obtained from heat treatment and distillation of petroleum fractions. A "petroleum pitch" refers to the residuum carbonaceous material obtained from distillation, deasphaltenation, or other separating methods, of crude oils, from the catalytic cracking of petroleum distillates, and from other thermal, or catalytic, processes of materials derived from crude oil. A "coal tar pitch" refers to the material obtained by distillation of coal.

Pitch compositions of the present disclosure can be produced from a hydrocarbon feedstock, wherein the hydrocarbon feedstock comprises one or more of: virgin naphtha, coker naphtha, steam cracked naphtha, catalytically cracked naphtha, gas oil, steam cracked gas oil, coker gas oil, catalytically cracked gas oil, steam cracked tar, vacuum gas oil, heavy coker gas oil, raffinate reformate, Fischer-Tropsch liquids, Fischer-Tropsch gases, natural gasoline, distillate, heating oil, jet fuel, diesel, kerosene, gasoline, atmospheric pipestill bottoms, vacuum pipestill streams including bottoms, wide boiling range naphtha to gas oil condensates, heavy non-virgin hydrocarbon streams from refineries, waxy residues, atmospheric residues, residue admixtures, crude oil, and any combination thereof.

Pitch compositions suitable for spinning described herein comprise: a pitch having a softening point temperature ($T_{sp}$) of 400° C. or less, and an oxidation onset temperature (OOT) at least 10° C. below $T_{sp}$, at a ramp rate of 10° C./min. The pitch may have a mesophase content of from 0 vol % to 100 vol % based on the total volume of the pitch; a $T_{sp}$ of 50° C. to 450° C.; a glass transition temperature ($T_g$) of 20° C. to 350° C.; an OOT of 50° C. to 400° C.; a carbon residue content of from 20 wt % to 99 wt %, based on the total weight of the pitch; and/or a maximum critical stress of the pitch is able to withstand at spinning temperature from 100 Pa to 10,000,000 Pa, and at an extensional strain rate ranging from 0 to 100 s$^{-1}$.

As used herein, "glass transition temperature" ($T_g$) refers to a temperature or a range of temperature at which a material (e.g., a polymer substrate) changes from a rigid glassy material to a soft material. The $T_g$ and the change in the heat capacity can be measured using the differential scanning calorimeter (DSC) technique. $T_g$ refers to a midpoint of the temperature at which a change in heat capacity is recorded on the second heating scan of a DSC experiment at 10° C./min heating and cooling rate. For purposes of the disclosure herein, $T_g$ may be measured using, for example, thermal analysis TA INSTRUMENTS DISCOVERY DSC or TA INSTRUMENTS Q2000™, as indicated.

Pitch can be classified as either an isotropic pitch, or a mesophase pitch. In general, an isotropic pitch is converted to a mesophase pitch. As used herein, the term "mesophase" refers to a polydisperse liquid crystalline material consisting of planar aromatic molecules (e.g., discotic liquid crystal). A "mesophase pitch" consists of "mesophase" and, optionally, an isotropic phase. The mesophase exhibits optical anisotropy when examined on a polarized light microscope. For example, a mesophase pitch can be a pitch containing more than about 10 vol % mesophase, based on the total volume of the pitch. A mesophase content of a pitch can be measured, for example, by imbedding various samples of the pitch in epoxy, followed by polishing the samples until they become highly reflective. A series of images can be recorded in order to quantify the anisotropic content where mesophase pitch has a heterogenous two-phase structure comprising an anisotropic region and an isotropic region. One skilled in the art will recognize that pitch can also be referred to as tar, bitumen, or asphalt and that when a pitch is produced from plants, it is also referred to as resin. Various pitches may be obtained as products in the gas oil or naphtha cracking industry as a carbonaceous residue consisting of a complex mixture of primarily aromatic organic compounds, which are solid at room temperature, and exhibit a relatively broad softening temperature range. Hence, a pitch can be obtained from heat treatment and distillation of petroleum fractions.

In at least one embodiment, the pitch has a mesophase content of from 0 vol % to 100 vol % (e.g., 5 vol % or less, or 4 vol % or less, or 3 vol % or less, or 2 vol % or less, or 1 vol % or less, or 0.5 vol % or less; alternately, 5 vol % or more, or 10 vol % or more, or 20 vol % or more, or vol % or more, or 40 vol % or more, or 50 vol % or more, or 60 vol % or more, or 70 vol % or more, or 80 vol % or more, or 90 vol % or more), based on the total volume of the pitch.

In at least one embodiment, the pitch has a $T_{sp}$ of 50° C. to 450° C. (or of 55° C. to 425° C., or of 60° C. to 400° C., or of 65° C. to 375° C., or of 70° C. to 325° C., or of 75° C. to 300° C., or of 80° C. to 275° C., or of 85° C. to 250° C., or of 90° C. to 225° C., or of 95° C. to 200° C.; alternately, of 50° C. to 400° C., or of 50° C. to 300° C., or of 50° C. to 200° C., or of 50° C. to 100° C.; alternately, of 100° C. to 450° C., or of 200° C. to 450° C., or of 300° C. to 450° C.).

In at least one embodiment, the pitch has a glass transition temperature ($T_g$) of 20° C. to 350° C., for example, the $T_g$ may be from 30° C. to 275° C., or from 50° C. to 250° C., or from 60° C. to 250° C., or from 100° C. to 260° C., or from 125° C. to 260° C., or from 150° C. to 260° C., or from 175° C. to 260° C., or from 200° C. to 260° C.

In at least one embodiment, the pitch has a carbon residue content of from 20 wt % to 99 wt %, such as from 30 wt % to 99 wt %, such as from 40 wt % to 99 wt %, such as from 50 wt % to 99 wt %, such as from 50 wt % to 95 wt %, such as from 50 wt % to 90 wt %, such as from 50 wt % to 85 wt %, and such as from 50 wt % to 80 wt %, based on the total weight of the pitch composition.

In at least one embodiment, in the context of rheology and spinning, the pitch has a maximum critical stress of from 100 Pa to 10,000,000 Pa (e.g., from 2,500 Pa to 250,000 Pa) during extension, at an extensional strain ranging from 0 to 100 s$^{-1}$.

Pitch fillers may be present in the pitch composition at 0.01 vol % to 99 vol %, or 0.1 vol % to 99 vol %, or 1 vol % to 90 vol %, or 2 vol % to 80 vol %, or 3 vol % to 70 vol %, or 4 vol % to 60 vol %, or 5 vol % to 50 vol %, or 6 vol % to 40 vol %, based on the total volume of the pitch composition. Examples of pitch fillers include, but are not limited to, carbon black, carbon nanotubes, polymers, inorganic materials (such as iron oxide and chromium oxide), organometallic materials, or any combination thereof. The pitch fillers may be used to provide reinforcing strength to the pitch to be spun, or may be used to increase the bulk volume of the pitch, or to modify the pitches reactivity during stabilization, or to modify the stabilized fiber during the carbonization process, or to modify the carbonized fiber during the graphitization process.

Pitch compositions of the present disclosure may comprise a pitch having a volatiles content of 1 wt % or less (or 0.9 wt % or less, or 0.8 wt % or less, or 0.7 wt % or less, or 0.6 wt % or less, or 0.5 wt % or less, or 0.4 wt % or less, or 0.3 wt % or less, or 0.2 wt % or less, or 0.1 wt % or less), based on the total weight of the pitch, at spinning temperature. As used herein, the term "volatile" refers to a substance that is readily vaporizable at the respective temperature and can include light products produced during cracking reactions. The term volatile can be applied to liquids and solids. For example, some solid materials can change directly from solid to vapor without ever becoming liquid, via a process called sublimation.

Pitch compositions of the present disclosure may comprise a pitch having a hydrogen content of from 3 wt % to 10 wt % (or from 3 wt % to 9 wt %, or from 3 wt % to 8 wt %, or from 3 wt % to 7 wt %, or from 3 wt % to 6 wt %, or from 3 wt % to 5 wt %, or from 3 wt % to 4 wt %, or from 4 wt % to 6 wt %), based on the total weight of the pitch.

Pitch compositions of the present disclosure may comprise a pitch having a nitrogen content of from 0 wt % to 3 wt % (or from 0 wt % to 2 wt %, or from 0 wt % to 1 wt %, or from 0.1 wt % to 2 wt %, or from 0.1 wt % to 1.9 wt %, or from 0.1 wt % to 1.8 wt %), based on the total weight of the pitch.

Pitch compositions of the present disclosure may comprise a pitch having a sulfur content of from 0 wt % to 10 wt % (or from 0 wt % to 9 wt %, or from 0 wt % to 8 wt %, or from 0 wt % to 7 wt %, or from 0 wt % to 6 wt %, or from 0 wt % to 5 wt %, or from 0 wt % to 4 wt %, or from 0 wt % to 3 wt %, or from 0 wt % to 2 wt %, or from 0 wt % to 1 wt %, or from 0.1 wt % to 7 wt %), based on the total weight of the pitch.

As used herein, "heat flow" is the amount of heat that is transferred per unit of mass in some material, usually measured in watt per gram. The heat flow is typically measured using the DSC thermal analysis technique. DSC measures the heat flow to or from a sample under controlled heating conditions. A small amount of sample (e.g., 1 mg to 10 mg) is contained within a closed crucible and placed into a temperature controlled furnace. A second crucible is used as a reference. The sample is then heated by the temperature controlled furnace. The most commonly used method of temperature control is dynamic (or scanning) mode which utilizes a constant heating rate. Another mode of operation is isothermal mode and is used to maintain a constant temperature. In both of these modes, the heat flow to or from the sample is measured as a function of time and temperature.

Differential Scanning calorimetry (DSC) was used to determine the glass transition temperature ($T_g$) of a pitch according to ASTM D3418-03. DSC data was obtained using a TA Instruments Discovery model Q2000™. Samples weighing approximately from 5 mg to 10 mg can be kept in an aluminum sample pan, and hermetically sealed for the glass transition $T_g$ measurements, or open for OOT measurements. The samples were heated to 200° C. at a rate of 10° C./minute and thereafter, held at 200° C. for 5 minutes. The samples were subsequently cooled to −90° C. at a rate of 10° C./minute and held isothermally for 5 minutes at −90° C. A second heating cycle was then performed by heating to 200° C. at 10° C./minute. $T_g$ is determined from the second heating cycle.

Regarding pitch OOT, the onset of oxidation can be reflected by a sudden release of heat at specific temperatures, due to an exothermic reaction of the pitches with air. Therefore, for a particular pitch, and at a particular heat ramp rate (e.g., 10° C./min), the exothermic reaction with air may initiate at a particular temperature and indicates the onset of oxidation has occurred. In at least one embodiment, the pitch has an OOT is from 50° C. to 400° C. (e.g., from 75° C. to 390° C., or from 100° C. to 380° C., or from 125° C. to 370° C., or from 150° C. to 360° C., or from 160° C. to 350° C. to, or from 170° C. to 340° C., or from 110° C. to 390° C., or from 120° C. to 380° C., or from 130° C. to 370° C., or from 140° C. to 360° C., or from 150° C. to 350° C.). Holding the temperature at the OOT for some period of time may be desirable during stabilization.

In some cases, pitch compositions of the present disclosure may comprise a pitch having a second OOT, such as the second OOT may be from 200° C. to 400° C. (or from 210° C. to 390° C., or from 220° C. to 380° C., or from 330° C. to 370° C.). Without being bound by any theory, the second heat release may be due to the reaction between air and a different component within the pitch. For instance, a mesophase pitch can have both an isotropic and an anisotropic phase within it, and the first OOT may correspond to one component of this pitch, and the second OOT may correspond to the second component of the pitch; similarly, the pitch may have varying amounts of reactive groups present and the different OOT temperatures may reflect these reactive groups (e.g., olefins, benzylic hydrogens, etc.). Alternatively, it could reflect the OOT of a second pitch that was included in a spun pitch blend.

In some instances it may be beneficial to increase pitch reactivity by the addition of additives that can function as either catalysts for the stabilization, carbonization, or graphitization processes. Alternatively, these additives could function as stoichiometric reactants with the pitch itself. Representative types of catalysts include organometallic complexes and inorganic complexes, and typical metals can be selected from the group consisting of: sodium, potassium, calcium, iron, nickel, tungsten, cobalt, lithium, magnesium, titanium, vanadium, chromium, copper, zinc, zirconium, molybdenum, or aluminum.

Methods for Producing Carbon Fibers

In at least one embodiment, the pitch or mixture of pitches has a softening point ($T_{sp}$) below 400° C., and spinning temperature between $T_{sp}$−30° C. and $T_{sp}$+80° C. The pitch may have a mesophase content of 5 vol % or less, based on the total volume of the pitch. Alternately, the pitch may have a mesophase content of 5 vol % to 100 vol %, based on the total volume of the pitch. Furthermore, the pitch may have an extensional viscosity of from 5 Pa·s to 500,000 Pa·s at an extensional strain rate ranging from 0 to 100 s$^{-1}$. The pitch may have an apparent rate constant ($k_{app}$) for oxidation under air greater than 0.001 s$^{-1}$ at T−$T_{sp}$ 0° C. (such as T−$T_{sp}$ ranging from −500° C. to 0° C., such as T−$T_{sp}$ ranging from −450° C. to 0° C., such as T−$T_{sp}$ ranging from −400° C. to such as T−$T_{sp}$ ranging from −350° C. to 0° C., such as T−$T_{sp}$ ranging from −300° C. to 0° C., such as T−$T_{sp}$ ranging from −250° C. to 0° C., such as T−$T_{sp}$ ranging from −200° C. to 0° C.).

The methods of the present disclosure may further comprise spinning the pitch at a temperature of from 50° C. to 430° C. (or from 75° C. to 420° C., or from 100° C. to 410° C., or from 125° C. to 400° C., or from 150° C. to 390° C., or from 175° C. to 380° C.), at a spinning speed of from 1 m/min to 3,000 m/min (or from 20 m/min to 2,000 m/min, or from 50 m/min to 1,500 m/min, or from 100 m/min to 1,000 m/min, or from 200 m/min to 900 m/min, or from 300 m/min to 800 m/min, or from 400 m/min to 700 m/min, or from 500 m/min to 600 m/min).

The spinning process may be carried out using a spinneret with a capillary size $r_0$ and a final fiber radius of $r_f$, where the ratio of $r_f/r_0 = \exp(-\varepsilon_R/2)$, wherein a is in the range of 1 μm to 1,000 μm, $r_0$ is in the range of 100 μm to 10,000 μm, and wherein the maximal Hencky strain at the spinning temperature range is at least $$\varepsilon_R = -2\ln\frac{rf}{r_0}.$$

In at least one embodiment, the capillary size $r_0$ is $r_f/[\exp(-\varepsilon_R/2)]$, wherein $\varepsilon_R$ is 0.7 or greater, at spinning temperature of 30° C. below softening point of the pitch composition to 80° C. above softening point of the pitch composition. The capillary size $r_0$ may be in the range of 50 μm to 5,000 μm, or 75 μm to 4,000 μm or 100 μm to 3,000 μm, or 150 μm to 1,500 μm, or 200 μm to 1,000 μm. For example, the capillary size $r_0$ may be 300 μm.

The spinning process may be a melt spinning process. The process may use a pitch composition with a softening point of 100° C. to 400° C. (or greater than 110° C., or greater than 120° C., or greater than 130° C., or greater than 140° C., or greater than 150° C., or greater than 160° C., or greater than 170° C., or greater than 180° C., or greater than 190° C., or greater than 200° C., or greater than 210° C., or greater than 220° C., or greater than 230° C., or greater than 240° C., or greater than 250° C., or greater than 260° C., or greater than 270° C., or greater than 280° C., or greater than 290° C., or greater than 300° C., or greater than 310° C., or greater than 320° C., or greater than 330° C., or greater than 340° C., or greater than 350° C.). The pitch composition of the present disclosure may be introduced to an extruder wherein the said pitch composition can be heated, sheared and extruded through capillaries to form the carbon fiber.

In at least one embodiment, methods of the present disclosure comprise spinning the carbon fiber wherein the pitch has a ($T_{sp}$–OOT) greater than 10° C., and wherein the spinning temperature is selected such that the volatiles content (wt %) is less than 1 wt %, such as less than 0.8 wt %, such as less than 0.6 wt %, such as less than 0.4 wt %, based on the total weight of the pitch, based on TGA. Thermogravimetric analysis (TGA) is used to determine the amount and rate of change in the mass of a sample as a function of temperature and time in a controlled atmosphere. The TGA technique can be used to characterize materials that exhibit either mass loss or gain due to loss of volatiles, decomposition, and oxidation. TGA measurements provide valuable information that can be used for selecting materials, identifying reactivity, quantifying composition and/or impurity levels, polymer characterization, moisture, and volatile contents. The ASTM E2550 standard test method for thermal stability by thermogravimetry covers the assessment of material thermal stability through the determination of the temperature at which the material starts to decompose or reacts and the extent of mass change using thermogravimetry.

For example, the methods of the present disclosure may further comprise: blending two or more pitches and extruding the blended pitches as a mixture. In another example, the methods of the present disclosure may further comprise: co-extruding two or more pitches using processing methods that mechanically cause a core-and-sheath filament structure to form, thus using the different pitches in the core and sheath. In that case, careful tailoring of the rheology of the pitches should be implemented such that one pitch will preferentially flow around the other pitch. In some cases, it may be desirable for the first pitch and the second pitch to have different viscosities. Blending two or more pitches may help control melt spinning, or to control the properties of the corresponding carbon fiber formed therefrom (e.g., tensile strength, reactivity towards oxygen, etc.).

For example, methods of the present disclosure may comprise blending a first pitch with one or more pitches, wherein blending enables tailoring either the spinnability of the pitch composition, or the fiber properties, or reactivity, or any combination of these properties.

In some cases, two or more pitches can be used to form a fiber without fully blending the pitches. For example, where a core-and-sheath filament is produced, the first pitch may form a first carbon fiber as a first layer (e.g., an inner/central layer) and the second pitch may form a second carbon fiber as a second layer (e.g., an outer layer), thus on the surface of the first layer. Other non-limiting examples of core-and-sheath filaments, may include: 1) having the second pitch formed on the surface of the first pitch, wherein the second pitch has a greater rate of reaction with air than the first pitch to produce an oxidized layer, thus preventing the fiber to stick when winding the fiber; 2) having a pitch that is stiffer on the outside than on the inside; 3) having a pitch that is more tolerant to surface defects on the outside than the inside; 4) having the second pitch primarily used to produce a much narrower fiber in the central/internal layer in order to increase the strength of the central/internal fiber layer; 5) having the second pitch that forms a better interface with a matrix. Where a core and sheath fiber is desired, careful tailoring of the rheology of the pitches should be implemented such that one pitch will preferentially flow around the other pitch.

The methods of the present disclosure may further comprise: oxidizing a pitch, a fiber, or fibrous web produced from the pitch, in presence of air, for a time period of from 0.1 seconds to 48 hours (such as 0.1 seconds to 36 hours, such as 0.1 seconds to 24 hours, such as from 0.1 seconds to 12 hours, such as 0.1 seconds to 6 hours, such as 0.1 seconds to 5 hours, such as 0.1 seconds to 4 hours, such as 0.1 seconds to 3 hours, such as 0.1 seconds to 2 hours, such as 0.1 seconds to 1 hour, such as 0.1 seconds to 50 minutes, such as 0.1 seconds to 40 minutes, such as seconds to 30 minutes, such as 0.1 seconds to 20 minutes, such as 0.1 seconds to 10 minutes, such as 0.1 seconds to 5 minutes), at a temperature of 50° C. or greater (or 75° C. or greater, or 100° C. or greater, or 150° C. or greater, or 200° C. or greater, or 250° C. or greater, or 300° C. or greater, or 350° C. or greater, or 400° C. or greater, or 450° C. or greater, or 500° C. or greater), at a heat ramp rate of 0.5° C./min or greater (or 1° C./min or greater, or 3° C./min or greater, or 5° C./min or greater, or 7° C./min or greater, or 10° C./min or greater, or 15° C./min or greater, or 20° C./min, or or 40° C./min, or 50° C./min, or 60° C./min, or 70° C./min, or 80° C./min, or 90° C./min, or 100° C./min, or 150° C./min, or 200° C./min, or greater). Alternatively, the stabilization may be performed by passing the fibers, or fibrous webs, continuously through an oven, where the residence times and temperatures are listed in the above ranges listed above. Additional reactive gases may be employed such as ozone, oxygen, nitrogen/oxygen blends, nitrous oxide, hydrogen peroxide, or any combination.

An onset of oxidation can occur and is observed by a sudden release of heat at the described temperatures, due to the exothermic reaction of the pitch with the oxygen present in the air. In some cases, the onsets of oxidation of a pitch may occurred at an OOT of 350° C. or less (or 340° C. or less, or 330° C. or less, or 320° C. or less, or 310° C. or less, or 300° C. or less, or 290° C. or less, or 280° C. or less, or 270° C. or less, or 260° C. or less, or 250° C. or less, or 240° C. or less, or 230° C. or less, or 220° C. or less, or 210° C. or less, or 200° C. or less, or 190° C. or less, 180° C. or less, 170° C. or less, 160° C. or less). In some other cases, a pitch may present two onsets of oxidation, wherein a second heat release (e.g., second OOT) can be greater than the first OOT. The second OOT may be greater than 200° C. (or 225° C. or greater, or 250° C. or greater, or 275° C. or greater, or 300° C. or greater, or 325° C. or greater, or 350° C. or greater). Without being bond by any theory, the second OOT may be due to the reaction between a pitch having a mesophase content significant enough to react with the oxygen of air, or the pitch may have varying amounts of reactive groups present and the different OOT temperatures may reflect these reactive groups (e.g., olefins, benzylic hydrogen, etc.), or the softening of the mesophase.

Once the fiber, or fibrous mat, is spun, it is subjected to oxidation, carbonization, and/or graphitization, the said fiber (often referred to as a green fiber) can be converted into a stabilized fiber, carbon fiber and/or graphite fiber, or an oxidized, carbonized, or graphitized fibrous webs. A binder pitch, graphitizable carbon microbeads, solid lubricants, activated carbon fiber, battery anodes, and carbon foams produced from the pitch composition of the present disclosure.

Various methods have been proposed in the prior art for stabilization of pitch-based carbon fibers, and the method most generally practiced is that in which an oxidation treatment is carried out in an oxygen-containing atmosphere, such as air. The stabilization of pitch fiber is a solid phase oxidation reaction by which pitch is converted to a non-meltable form. In some cases the air may contain $NO_2$ as an oxidative gas. Stabilization improves the strength of the carbon fiber and renders it infusible. The oxidation of the surface layer of the fiber is generally faster than that of the central portion of the fiber, and thus a stabilized fiber having different degrees of oxidation at the surface layer and at the central portion is formed. The oxidation at the surface layer and at the central portion may be controlled to optimum degrees by adding water to the oxidative atmosphere such as air, for example.

The stabilized pitch may then be subjected to carbonization by heating to temperatures in the range of from 500° C. to 2,000° C. in an inert or largely inert atmosphere. If graphitization is desired, the carbonized fibers may then be graphitized by additional heating at temperatures from about 1,600° C. to 3,000° C. in an inert or largely inert atmosphere.

Methods for Producing Carbon Fiber Composites

The methods of the present disclosure may further comprise combining a matrix material with the spun fiber to create a carbon fiber composite. The carbon fiber composite may have a carbon fiber content of from 1 vol % to 70 vol % (or from 2.5 vol % to 60 vol %, or from 5 vol % to 50 vol %, or from 10 vol % to 40 vol %), and/or a matrix content of from 30 vol % to 99 vol % (or from 40 vol % to 97.5 vol %, or from 50 vol % to 95 vol %, or from 60 vol % to 90 vol %), based on the total volume of the carbon fiber composite. Alternatively, the pitch may be used as a binder/matrix for composite applications as well, such as in the production of carbon/carbon composites. When the pitch is used as a binder/matrix, the composite filler can be carbon fiber, glass fiber, metal fiber, boron fiber, carbon black, carbon nanotubes, and combinations thereof. For example, a pitch itself can be used as a matrix and/or binder for producing carbon-carbon composites.

The matrix material used herein can be produced from a thermoset polymer (e.g., cyclopentadiene, dicyclopentadiene, epoxy, pitch, phenolic resins, vinylester, polyimide and polyesters), a thermoplastic polymer (e.g., a thermoplastic polymer including one or more of: polyethylene, polypropylene, high-density polyethylene, linear low-density polyethylene, low-density polyethylene, polyamides, polyvinylchloride, polyetheretherketone, polyetherketoneketone, polyaryletherketone, polyetherimide and polyphenylene sulfide), cement, concrete, ceramic, metal, metal alloy, or a combination thereof.

The polymer matrices most widely used for composites in commercial and high-performance aerospace applications are thermoset resins, also known as "thermoset polymer matrix", consisting of polymer chains that are permanently cured into a crosslinked network when mixed with a catalyst, exposed to heat, or both. A thermoset matrix may include cement, concrete, ceramic, glasses, metal, or metal alloys. A thermoset matrix can be incorporated with resins such as polyesters, vinyl esters, epoxies, bismaleimides, cyanate esters, polyimides or phenolics. When cured by thermal and/or chemical (catalyst or promoter) or other means, the thermoset matrix become substantially infusible and insoluble. After cure, a thermoset matrix cannot be returned to its uncured state. Curing usually occurs under elevated temperature and/or pressure conditions in an oven and/or vacuum bag or in an autoclave. Alternative but less used curing technologies include electron beam, ultraviolet (UV) radiation, X-ray and microwave processes. When cured, the thermoset polymer matrix become substantially infusible and insoluble. After cure, a thermoset polymer matrix cannot be returned to its uncured state. Composites made with thermoset matrices are strong and have very good fatigue strength. Such composites can be extremely brittle and may have low impact-toughness making. Thermoset polymer matrix are commonly used for high-heat applications and/or chemical resistance because the thermoset polymer matrix does not melt.

The other most commonly used matrix type is thermoplastic (TP) resin, also referred to as "thermoplastic polymer matrix" or "thermoplastic matrix", which is proving an increasingly popular option for composites manufacturers. TP polymers are polymers that can be molded, melted, and remolded without altering its chemical structure. In some cases, a thermoplastic matrix can be tougher and less brittle than thermosets, with very good impact resistance and damage tolerance. In some other cases, a thermoplastic matrix may become glassy and very brittle at temperatures below its glass transition temperature. Since the matrix can be melted, the composite materials can be easier to repair and can be remolded and recycled easily. Thermoplastic matrix can be less dense than thermoset matrix, making them a viable alternative for weight critical applications. For purposes of the present disclosure, the thermoplastic polymers may be selected from the group consisting of: polyethylene, polypropylene, high-density polyethylene, linear low-density polyethylene, low-density polyethylene, polyamides, polyvinylchloride, polyetheretherketone, polyetherketoneketone, polyaryletherketone, polyetherimide and polyphenylene sulfide, and any combination thereof.

The matrix used herein can be produced from a thermoset polymer (e.g., cyclopentadiene, dicyclopentadiene, epoxy, phenolic resins, vinylester, polyimide and polyesters), a thermoplastic polymer (e.g., a thermoplastic polymer including one or more of: polyethylene, polypropylene, high-density polyethylene, linear low-density polyethylene, low-density polyethylene, polyamides, polyvinylchloride, polyetheretherketone, polyetherketoneketone, polyaryletherketone, polyetherimide and polyphenylene sulfide), cement, concrete, ceramic, metal, metal alloy, or a combination thereof.

A carbon fiber composite of the present disclosure may comprise: a matrix material and a carbon fiber produced from a pitch composition, wherein the pitch composition comprises: a pitch having a softening point temperature ($T_{sp}$) of 400° C. or less, and an oxidation onset temperature (OOT) at least 10° C. below $T_{sp}$, at a ramp rate of 10° C./min.

For purposes of the present disclosure, the thermoplastic polymer is selected from a group consisting of: polyethylene, polypropylene, high-density polyethylene, linear low-density polyethylene, low-density polyethylene, polyamides, polyvinylchloride, polyetheretherketone, polyetherketoneketone, polyaryletherketone, polyetherimide and polyphenylene sulfide, and any combination thereof.

Additionally, the carbon fibers of the present disclosure may be used in woven materials (e.g., woven broadgood). Such materials are useful in producing tapes and prepregs for example. Additionally, the pitch may be used to produce continuous filaments that are wound onto spools, and also nonwoven fabrics such as meltblown or spunbond fabrics where fibers are laid into fibrous webs or mats.

Non-limiting examples of carbon articles may include automotive body parts (e.g., deck lids, hoods, front end, bumpers, doors, chassis, suspension systems such as leaf springs, drive shafts), off-shore tethers and drilling risers, wind turbine blades, insulating and sealing materials used in construction and road building (e.g., concrete), aircraft and space systems, high performance aquatic vessels, airplanes, sports equipment, flying drones, armor, armored vehicles, military aircraft, energy storage systems, fireproof materials, light weight cylinders and pressure vessels, and medical devices. Furthermore, fibers of the present disclosure (e.g., fiber filaments or webs) may be used as insulation materials (e.g., thermal or acoustic), or as shielding materials (e.g., electromagnetic or radio frequency), or in friction control surfaces (e.g., brake pads, such as aircraft brake pads). Carbon fibers may be included with graphitic foams, and pitch compositions with the preceding properties may be used to produce graphitic foams, for protection against explosions and the like.

Embodiments disclosed herein include:

A. Pitch compositions suitable for spinning. The pitch compositions comprise: a pitch having a softening point temperature ($T_{sp}$) of 400° C. or less, and an oxidation onset temperature (OOT) at least 10° C. below the $T_{sp}$ at a ramp rate of 10° C./min.

B. Carbon fibers. The carbon fibers comprise: a carbon fiber produced from a pitch composition, wherein the pitch composition comprises: a pitch having a softening point temperature ($T_{sp}$) of 400° C. or less, and an oxidation onset temperature (OOT) at least 10° C. below the $T_{sp}$ at a ramp rate of 10° C./min.

C. Carbon fiber composites. The carbon fiber composites comprise: a matrix material; and a carbon fiber produced from a pitch composition, wherein the pitch composition comprises: a pitch having a softening point temperature ($T_{sp}$) of 400° C. or less, and an oxidation onset temperature (OOT) at least 10° C. below $T_{sp}$ at a ramp rate of 10° C./min.

D. Processes for stabilizing the carbon fibers. The processes comprise: providing a pitch having a softening point temperature ($T_{sp}$) of 400° C. or less, and an oxidation onset temperature (OOT) at least 10° C. below $T_{sp}$; spinning the pitch to produce a carbon fiber; and stabilizing the carbon fiber in the presence of air, or other reactive gas, to produce a stabilized carbon fiber by heating the carbon fiber to a temperature that is at least 10° C. below the $T_{sp}$ of the pitch.

E. Processes for making pitch compositions suitable for spinning. The processes comprise: introducing a hydrocarbon feed to one or more reaction zones to produce a reaction effluent, wherein the reaction effluent is directed to one or more separation zones that fractionates the reaction effluent to produce a pitch product, wherein the pitch product has a $T_{sp}$ greater than the $T_{sp}$ of the hydrocarbon feed and an OOT at least 10° C. below the $T_{sp}$ of the pitch product, at a ramp rate of 10° C./min.

Embodiments A, B, C, D, and E may have one or more of the following elements in any combination:

Element 1: wherein the pitch comprises a mesophase content of from 0 vol % to 100 vol %, based on the total volume of the pitch.

Element 2: wherein the pitch comprises a mesophase content of 5 vol % or less, based on the total volume of the pitch.

Element 3: wherein the pitch comprises a mesophase content of more than 5 vol %, based on the total volume of the pitch.

Element 4: wherein the pitch has a volatiles content of 1 wt % or less, based on the total weight of the pitch, at spinning temperature.

Element 5: wherein the pitch has a $T_{sp}$ of 50° C. or greater.

Element 6: wherein the pitch has a $T_{sp}$ of from 80° C. to 400° C.

Element 7: wherein the pitch has a glass transition temperature ($T_g$) of 20° C. to 350° C.

Element 8: wherein the pitch has a carbon residue content of from 20 wt % to 99 wt %, based on the total weight of the pitch.

Element 9: wherein the OOT is from 100° C. to 400° C.

Element 10: wherein the pitch has a second OOT.

Element 11: wherein the second OOT is from 200° C. to 400° C.

Element 12: wherein the pitch has a maximum critical stress of from 100 Pa to 10,000,000 Pa at spinning temperature, and/or at an extensional strain rate ranging from 0 to 100 $s^{-1}$.

Element 13: wherein the maximum critical stress is from 2,500 Pa to 250,000 Pa at spinning temperature, and/or at an extensional strain rate ranging from 0 to 100 $s^{-1}$.

Element 14: wherein the pitch has an extensional viscosity of from 5 Pa·s to 500,000 Pa·s at spinning temperature, and/or at an extensional strain rate ranging from 0 to 100 $s^{-1}$.

Element 15: wherein the pitch has an apparent rate constant ($k_{app}$) for oxidation under air greater than 0.001 $s^{-1}$ at T–$T_{sp}$ 0° C.

Element 16: wherein the pitch composition is a blend of two or more pitches.

Element 17: a fiber, an oxidized fiber, carbonized fiber, graphitized fiber, fibrous web, oxidized fibrous web, carbonized fibrous web, or graphitized fibrous web prepared using the pitch composition of any of the preceding elements.

Element 18: a binder pitch, graphitizable carbon microbeads, solid lubricants, activated carbon fiber, battery anodes, and carbon foams produced from the pitch composition of any of the preceding elements.

Element 19: wherein the carbon fiber produced therefrom is stabilized in presence of air.

Element 20: wherein the carbon fiber produced from a pitch composition, wherein the pitch composition comprises: a pitch having a softening point temperature ($T_{sp}$) of 400° C. or less, and an oxidation onset temperature (OOT) at least 10° C. below the $T_{sp}$ at a ramp rate of 10° C./min.

Element 21: wherein the pitch comprises a mesophase content of from 0 vol % to 100 vol %, based on the total volume of the pitch Element 22: wherein the pitch has a volatiles content of 1 wt % or less, based on the total weight of the pitch, at spinning temperature.

Element 23: wherein the pitch has a ($T_{sp}$–OOT1) greater than 10° C. and wherein the carbon fiber is spun at a spinning temperature selected such that the volatiles content is less than 1 wt %, based on the total weight of the pitch.

Element 24: wherein the pitch has a $T_{sp}$ of 50° C. or greater.

Element 25: wherein the pitch has a $T_{sp}$ of from 80° C. to 400° C.

Element 26: wherein the pitch has a glass transition temperature ($T_g$) of 20° C. to 350° C.

Element 27: wherein the pitch has a carbon residue content of from 20 wt % to 99 wt %, based on the total weight of the pitch.

Element 28: wherein the OOT is from 100° C. to 400° C.

Element 29: wherein the pitch has a second OOT from 200° C. to 400° C.

Element 30: wherein the pitch has a maximum critical stress of from 100 Pa to 10,000,000 Pa, at an extensional strain rate ranging from 0 to 100 s$^{-1}$.

Element 31: wherein the pitch has an extensional viscosity of from 5 Pa·s to 500,000 Pa·s, at an extensional strain rate ranging from 0 to 100 s$^{-1}$.

Element 32: wherein the pitch has an apparent rate constant ($k_{app}$) for oxidation under air greater than 0.001 s$^{-1}$ at T–$T_{sp}$ 0° C.

Element 33: wherein the fiber is produced by spinning two or more pitches together.

Element 34: wherein the pitch composition is a blend of two or more pitches.

Element 35: wherein the pitch comprises a mesophase content of 5 vol % or less, based on the total volume of the pitch.

Element 36: wherein the pitch comprises a mesophase content of more than 5 vol %, based on the total volume of the pitch.

Element 37: wherein the pitch has a volatiles content of 1 wt % or less, based on the total weight of the pitch, at spinning temperature.

Element 38: wherein the pitch has a ($T_{sp}$–OOT1) greater than 10° C. at a ramp rate of and wherein the carbon fiber is spun at a spinning temperature selected such that the volatiles content is less than 1 wt %, based on the total weight of the pitch.

Element 39: wherein the pitch has a $T_{sp}$ of 50° C. or greater.

Element 40: wherein the pitch has a $T_{sp}$ of from 80° C. to 400° C.

Element 41: wherein the OOT is from 100° C. to 400° C.

Element 42: wherein the pitch has a second OOT from 200° C. to 400° C.

Element 43: wherein the pitch composition is a blend of two or more pitches.

Element 44: wherein the pitch composition has an apparent rate constant ($k_{app}$) for oxidation under air greater than 0.001 s$^{-1}$ at T–$T_{sp}$ 0° C.

Element 45: wherein the fiber is produced by spinning two or more pitches together.

Element 46: wherein the matrix is a thermoset matrix, a thermoplastic matrix, cement, concrete, ceramic, metal, metal alloy, pitch, or a combination thereof.

Element 47: wherein the thermoplastic matrix is selected from a group consisting of: polyethylene, polypropylene, high-density polyethylene, linear low-density polyethylene, low-density polyethylene, polyamides, polyvinylchloride, polyetheretherketone, polyetherketoneketone, polyaryletherketone, polyetherimide and polyphenylene sulfide, and any combination thereof.

Element 48: wherein the carbon fiber content of from 1 vol % to 70 vol % and a matrix content of from 30 vol % to 99 vol %, based on the total volume of the carbon fiber composite.

Element 49: wherein the pitch has a mesophase content of 5 vol % or less, based on the total volume of the pitch.

Element 50: wherein the pitch has a mesophase content of 5 vol % to 100 vol %, based on the total volume of the pitch.

Element 51: wherein the pitch has an extensional viscosity of from 5 Pa·s to 500,000 Pa·s, at an extensional strain rate from 0 to 100 s$^{-1}$.

Element 52: wherein the hydrocarbon feed is selected from the group consisting of: crude oil, MCB bottoms, steam cracker tar, hydrotreated MCB, hydrotreated steam cracker tar, vacuum residue, atmospheric residue, reformate, naphthalene, coal tar, coal tar pitch, vacuum gas oil, distillate, or hydrotreated versions of any of the aforementioned streams.

Element 53: wherein the separation zone consists of a flash drum, distillation tower, chromatographic separation, membrane-filtration, or deasphaltenation.

Element 54: wherein the reaction zone consists of a fixed bed reactor, slurry reactor, tubular reactor, continuous stirred tank reactor, batch reactor, or semi-batch reactor.

Element 55: wherein the pitch product $T_{sp}$ is in the range of 100° C. to 400° C.

Element 56: wherein the pitch product has a mesophase content of about 5 vol % or greater, based on the total volume of the pitch product.

Element 57: wherein the pitch product has a mesophase content of less than 5 vol %, based on the total volume of the pitch product.

By way of non-limiting example, exemplary combinations applicable to A include, but are not limited to: 1 or 2, and 3; 1 or 2, and 4; 1 or 2, and 5; 1 or 2, and 6; 1 or 2, and 7; 1 or 2, and 8; 1 or 2, and 9; 1 or 2, and 10; 1 or 2, and 10 and 11; 1 or 2, and 12; 1 or 2, and 13; 1 or 2, and 13-20; 1 or 2, and 14 and 15; 1 or 2, and 16; 1 or 2, and 15-20; 1 or 2, and 18; 1 or 2, and 19; 1 or 2, and 19 and 20; 1 or 2, and 6; 13 and 14; 13 and 15; and 13 and 16; and 18 and 19; and 19 and 20.

By way of non-limiting example, exemplary combinations applicable to B include, but are not limited to: 21 or 22, and 23; 21 or 22, and 24; 21 or 22, and 25; 21 or 22, and 26; 21 or 22, and 27; 21 or 22, and 28; 21 or 22, and 29; 21 or 22, and 30; 21 or 22, and 31; 21 or 22, and 32; 21 or 22, and 33; 21 or 22, and 34; 21 or 22, and 23 and 26; 21 or 22, and 25-29; 21 or 22, and 26-34; 21 or 22, and 25; 26 and 29; and 31 and 33.

By way of non-limiting example, exemplary combinations applicable to C include, but are not limited to: 35 or 36, and 37; 35 or 36, and 38; 35 or 36, and 39; 35 or 36, and 40; 35 or 36, and 41; 35 or 36, and 42; 35 or 36, and 43; 35 or 36, and 44; 35 or 36, and 45; 35 or 36, and 46; 35 or 36, and 47; 35 or 36, and 48; 35 or 36, and 38-41; 35 or 36, and 39 and 40; 35 or 36, and 42-44; 35 or 36, and 38; 40 and 41; 42 and 44; and 47 and 48.

By way of non-limiting example, exemplary combinations applicable to D include, but are not limited to: 49 or 50, and 51.

By way of non-limiting example, exemplary combinations applicable to E include, but are not limited to: 52 or 53, and 54; 52 or 53, and 55; 52 or 53, and 56; 52 or 53, and 57; 52 or 53, and 54-57.

To facilitate a better understanding of the embodiments of the present disclosure, the following examples of preferred or representative embodiments are given. In no way should the following examples be read to limit, or to define, the scope of the present disclosure.

EXAMPLES

A series of pitches were produced from a hydrotreated steam cracker tar. The resulting product was vacuum distilled to yield a +1,049° F. (+565° C.) vacuum bottoms fraction. The vacuum bottoms fraction had the following properties: 170° C. softening point, 38.6 wt % MCRT, 92.09 wt % C, 7.41 wt % H, 0.00 wt % N, and 0.51 wt % S.

Each isotropic pitch was heat treated at 400° C. for 0, 1, 2, 3, 4, 5, or 6 hours, producing a corresponding heat treated pitch (Samples 1-14). Table 1 illustrates the properties of Samples 1-14 (e.g., % yield, wt % MCRT (carbon residue), wt % C, wt % H, wt % N, wt % S), mesophase content).

Representative Procedure for Generating Heat Treated Pitch:

A vial was loaded with about 2 g of the vacuum bottoms fraction and placed in a Micro Carbon Residue Tester MCRT160 unit. The unit was purged with 600 cm³/min nitrogen and heated to 100° C. within 10 minutes, followed by heating to 400° C. in 30 minutes. Immediately after 400° C. was reached, the flow rate was reduced to 150 cm³/min and the sample was held at this time for the specified period of time. Once the desired soak time was completed, heating was stopped, and the nitrogen flow rate was increased to 600 cm³/min to cool the unit down. The temperature frequently decreased to 300° C. within about 25 minutes, 200° C. within about 65 minutes, and within 120° C. within about 137 minutes.

The mesophase content was measured by embedding the pitch samples in epoxy, and then polishing the pitch samples until the surface of said pitch samples were highly reflective. Then, a series of images were acquired to quantify the anisotropic content. Frequently, 10 images would be acquired to determine the mesophase content.

In-house glass transition temperatures ($T_g$) were measured under inert atmosphere using a TA Instruments Q2000™ DSC equipped with a liquid nitrogen accessory for cooling to subzero temperatures. The lower operation limit of the TA Instruments Q2000™ DSC was −170° C. and the higher operating limit was 400° C.

Instrument Calibration:

DSC was calibrated over the temperature range of −170° C. to 400° C. using indium metal as a calibration metal required by the manufacturer for both temperature and heat of fusion, at a heating rate of 10° C./min. Instrument performance was evaluated within tight limits by comparing the heat of fusion of indium with literature value of 28.46 J/g by more than 3%. If the onset temperature consistently differed from the accepted literature value of 156.6° C. by more than 0.3° C., the instrument would be recalibrated.

Method:

Glass transition temperatures of samples 1-13 were measured with in house DSC with the following protocol:
Equilibrate at 200° C.;
Isothermal 5 minutes;
Cool at a rate of 10° C./min to −90° C.;
Isothermal 5 minutes;
Heat at a rate of 10° C./min to 200° C. ($T_g$ was measured at this heating step).

Measurement of $T_g$ by Calorimetry:

Differential Scanning calorimetry (DSC) was used to determine the glass transition temperature ($T_g$) and the melt temperature ($T_m$) of a pitch according to the following standard test methods:

DIN 53 765 (1994), testing of plastics and elastomers-thermal analysis; DSC-Method/note: EQV ISO 11357-5 (1999).

ASTM D 3418 (1999), standard test method for transition temperatures by differential scanning calorimetry analysis.

ISO 11357-1 (1997), plastics-differential scanning calorimetry (DSC)—Part 1: general principles.

$T_g$ of the pitch samples was defined as a phase change in the sample from a glassy state to a mobile state. The chain segments showed greater mobility above $T_g$ than it was below it (e.g., in a frozen state). Since a new form of segmental mobility change occurred at $T_g$, a step-like change occurred in the specific heat capacity $C_P$ of the pitch sample, which was measured by a change in the total heat flow obtained by DSC measurements, as illustrated in FIG. 1. The temperature range over which such transition occurred is also referred to as the glass transition range or freezing range. The measured temperature at which half of the change in specific heat capacity has occurred is referred to as $T_g$. The reproducibility of the measurements was +/−2° C. and the repeatability was +/−1° C. FIG. 1 is a DSC curve of heat flow (W/g) versus the temperature (° C.) of a pitch (Sample 4), under air. $T_i$ referred to as the point of first detectable deviation from the extrapolated baseline prior to the transition. $T_{fi}$ referred to as the point of last deviation from the extrapolated baseline beyond the transition. $T_e$ referred to as the point of intersection of the tangent drawn at the point of greatest slope on the transition curve with the extrapolated baseline following the transition. $T_o$ referred to as the point of intersection of the tangent drawn at the point of greatest slope on the transition curve with the extrapolated baseline prior to the transition. $T_{mid}$ referred to as the point on the thermal curve corresponding to half the heat flow difference between the extrapolated onset and extrapolated end.

Each pitch was characterized by MCRT as measured according to the ASTM D4530-15 standard test method, softening point $T_{sp}$ as measured using a METTLER TOLEDO® dropping point instrument (METTLER TOLEDO® DP70), according to a procedure analogous to ASTM D3104 at a 2° C./min ramp rate, elemental analysis, TGA, and DSC under air, and separately under nitrogen. DSC under air was used to determine the OOT of each pitch, and by TGA to determine the amount of volatiles present in each pitch. From these measurements, a temperature difference ($T_{sp}$–OOT) for each pitch was obtained. The heat ramp rate was set to 10° C./min. Table 1 illustrates the softening point and onset of oxidation for a series of pitches (e.g., Samples 1-14). Pitches with a positive ($T_{sp}$–OOT) value (e.g., Samples 3-8 and 11-14) demonstrated sufficient reactivity to permit the exothermic reaction with air below their softening point, thus making them suitable for spinning into carbon fibers. Pitches with a negative ($T_{sp}$–OOT) value (e.g., Samples 1-2 and 9-10) demonstrated insufficient reactivity to permit reaction with air below their softening point. The results obtained for Samples 1-2 and 9-10 indicated that a fiber produced from one of those pitches would melt before the pitch would react with air. On the other hand, a positive value of the difference ($T_{sp}$–OOT) indicated that the pitch was capable of reacting at temperatures below its softening point. $T_{sp}$ is the softening point of the pitch. $T_g$ is the glass transition temperature, and corresponds to a phase change of a material from a glassy state to a mobile state and is reflected by a change in specific heat capacity. $T_g$ inflection is also referred to as T, defined above. $T_g$ end is also referred to as $T_{fi}$. $\Delta T_g$ (° C.) is the difference between $T_g$ end (° C.) minus $T_g$ onset (° C.), reflecting the molecular weight distribution of the pitch sample, wherein the breadth of the $T_g$ transition is indicative of the breadth of the molecular structure/diversity. OOT1 is the oxidation onset temperature recorded during a first heat release. In some cases, a second heat release occurred, thus a second onset of oxidation was recorded and referred to as OOT2.

TABLE 1

| Entry | Sample | Time at 400° C. (hour) | $T_{sp}$ (° C.) | $T_g$ onset (° C.) | $T_g$ inflection (° C.) | $T_g$ end (° C.) |
|---|---|---|---|---|---|---|
| 1 | 1 | 0 | 170 | 98 | 105 | 112 |
| 2 | 2 | 1 | 153.3 | 85 | 89 | 92 |
| 3 | 3 | 2 | 175.8 | 95 | 105 | 115 |
| 4 | 4 | 3 | 200.8 | 109 | 121 | 132 |
| 5 | 5 | 4 | 228.9 | 125 | 137 | 150 |
| 6 | 6 | 5 | 248.6 | — | — | — |
| 7 | 14 | 5 | — | 137 | 147 | 158 |
| 8 | 7 | 6 | 313.2 | 149 | 161 | 172 |
| 9 | 8 | 0 | 171.9 | 99 | 105 | 112 |
| 10 | 9 | 1 | 163.2 | 81 | 89 | 97 |
| 11 | 10 | 2 | 183.9 | 100 | 110 | 120 |
| 12 | 11 | 3 | 206.8 | 113 | 125 | 137 |
| 13 | 12 | 4 | 240.2 | 130 | 143 | 156 |
| 14 | 13 | 6 | 323.2 | 149 | 163 | 177 |

| Entry | Sample | Yield (%) | Carbon Residue (MCRT, wt %) | C content (wt %) | H content (wt %) | N content (wt %) | S content (wt %) | Mesophase Content (vol %) |
|---|---|---|---|---|---|---|---|---|
| 1 | 1 | N/A | 38.65 | 92.09 | 7.41 | 0 | 0.51 | 0 |
| 2 | 2 | 74.38 | 53.51 | 92.65 | 6.5 | 0.25 | 0.54 | 0 |
| 3 | 3 | 62.84 | 67.67 | 93.62 | 5.65 | 0.24 | 0.42 | 0 |
| 4 | 4 | 58.58 | 73.96 | 93.95 | 5.25 | 0.23 | 0.48 | 0.94 |
| 5 | 5 | 55.25 | 79.19 | 94.21 | 5.01 | 0.24 | 0.43 | 12.58 |
| 6 | 6 | 53.83 | — | — | — | — | — | — |
| 7 | 14 | 52.03 | 81.94 | 94.24 | 4.85 | 0.26 | 0.45 | 29.3 |
| 8 | 7 | 52.38 | 86.32 | 94.32 | 4.7 | 0.24 | 0.42 | 39 |
| 9 | 8 | N/A | 40.1 | 92.02 | 7.37 | 0.24 | 0.47 | — |
| 10 | 9 | 74.49 | 62.32 | 92.86 | 6.35 | 0.23 | 0.40 | 0.2 |
| 11 | 10 | 63.72 | 69.11 | 93.84 | 5.54 | 0.23 | 0.45 | 1 |
| 12 | 11 | 59.97 | 75.85 | 94.01 | 5.19 | 0.24 | 0.47 | 4 |
| 13 | 12 | 56.54 | 80.72 | 94.26 | 4.93 | 0.23 | 0.36 | 15 |
| 14 | 13 | 53.98 | 86.86 | 94.48 | 4.51 | 0.23 | 0.45 | 54 |

| Entry | Sample | $\Delta T_g$ (° C.) | $T_{sp} - T_g$ (° C.) | OOT1 (° C) | OOT2 (° C.) | $T_{sp}$ – OOT1 (° C) |
|---|---|---|---|---|---|---|
| 1 | 1 | 14 | 65 | 252 | N/A | −82 |
| 2 | 2 | 7 | 64.3 | 244 | N/A | −90.7 |
| 3 | 3 | 20 | 70.8 | 118 | 238 | 57.8 |
| 4 | 4 | 23 | 79.8 | 147 | 239 | 53.8 |
| 5 | 5 | 25 | 91.9 | 170 | 311 | 58.9 |
| 6 | 6 | — | — | 175 | 313 | 73.6 |
| 7 | 14 | 21 | — | 179 | 324 | — |
| 8 | 7 | 23 | 152.2 | 186 | 325 | 127.2 |
| 9 | 8 | 13 | 66.9 | 252 | N/A | −80.1 |
| 10 | 9 | 16 | 74.2 | 250 | N/A | −86.8 |
| 11 | 10 | 20 | 73.9 | 135 | 229 | 48.9 |
| 12 | 11 | 24 | 81.8 | 154 | 271 | 52.8 |
| 13 | 12 | 26 | 97.2 | 171 | 311 | 69.2 |
| 14 | 13 | 28 | 160.2 | 198 | 333 | 125.2 |

Figure 2A:
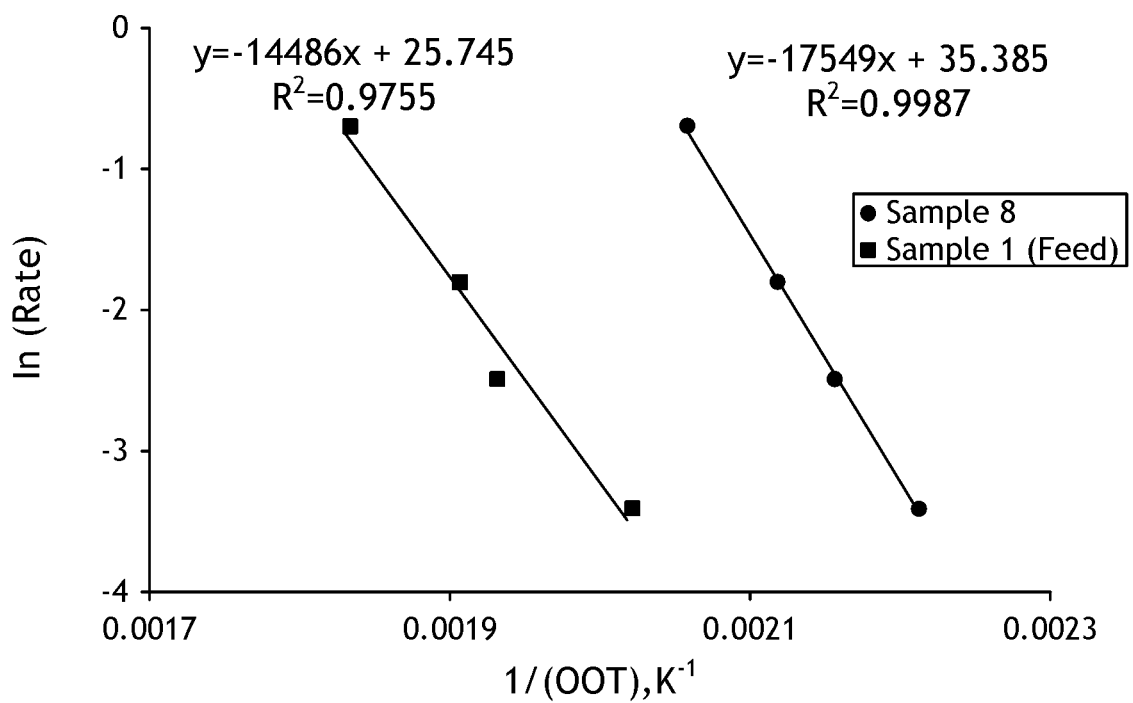
FIG. 2A is a graph depicting the kinetics of oxidation of the vacuum residue of a hydrotreated steam cracker tar (HDT SCT) and a mesophase pitch formed from the said HDT SCT, represented by the natural logarithm of the apparent rate ln (ramp rate) versus (1/OOT), where OOT corresponds to the onset of oxidation temperature.
Figure 2B:
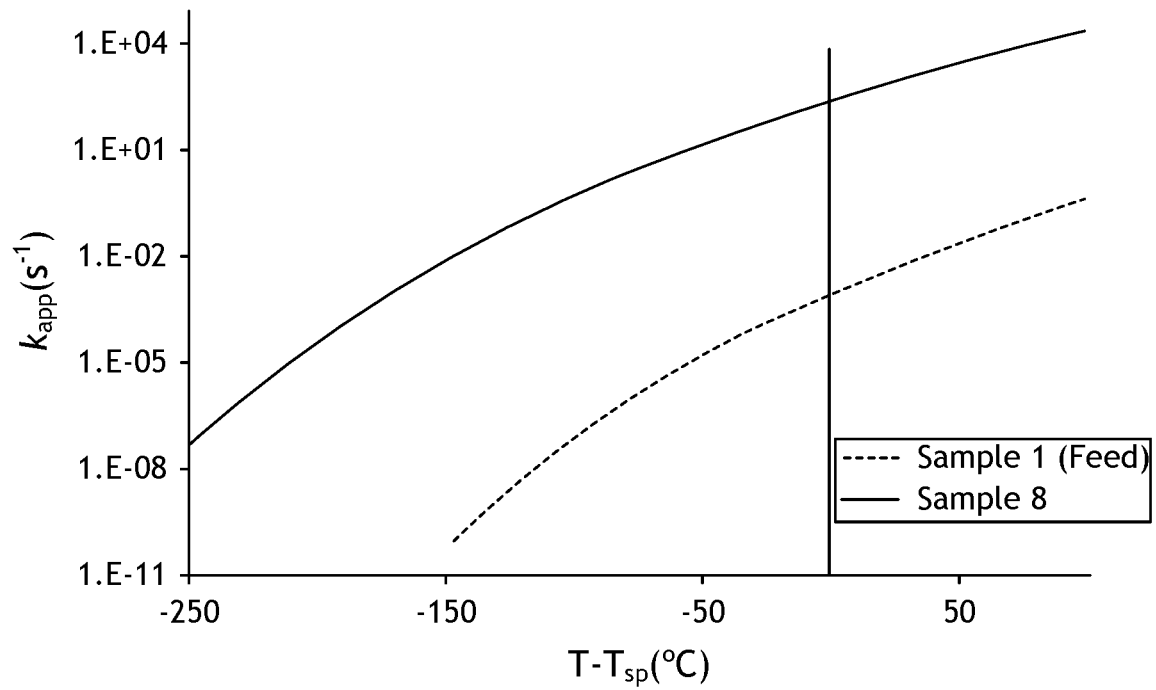
FIG. 2B is a graph depicting the apparent rate constant ($k_{obs}$, $s^{-1}$), predicted based on the activation parameters determined from the kinetic analysis, at various temperatures relative to that pitch's softening point $T_{sp}$ and is plotted as a difference $(T_{actual}-T_{sp})$.

The kinetics of oxidation of the pitch samples were determined by variable ramp rate OOT study (see Table 2, and FIGS. 2A and 2B). FIG. 2A is a graph depicting the kinetics of oxidation of the vacuum residue of a hydrotreated steam cracker tar (HDT SCT) and a mesophase pitch formed from the said HDT SCT, represented by the natural logarithm of the apparent rate ln (ramp rate) versus (1/OOT), where OOT corresponds to the onset of oxidation temperature. FIG. 2B is a graph depicting the apparent rate constant ($k_{app}$, $s^{-1}$), predicted based on the activation parameters determined from the kinetic analysis, at various temperatures relative to that pitch's softening point $T_{sp}$ and is plotted as a difference ($T_{actual} - T_{sp}$). The variable ramp rate study revealed the activation parameters for each pitch sample and was obtained by plotting the natural log of the ramp rate to the OOT. From the said activation parameters, the apparent rate constants ($k_{app}$) for stabilization were calculated, and a predicted apparent rate constant ($k_{app}$) plotted versus (1/OOT), as depicted in FIG. 2A. The apparent rate constants ($k_{app}$) were predicted at different temperatures, and then related to the difference in the softening point temperature $T_{sp}$, thus enabling a plot of the apparent rate constant ($k_{app}$) versus the difference between the absolute temperature and the softening point of the pitch sample to get an understanding of the performance of the pitch sample relative to its $T_{sp}$ (FIG. 2B). "A" is the pre-exponential factor ($s^{-1}$) and $E_a$ is the activation energy (kJ/mol).

TABLE 2

| K (rate) | K/s | OOT (° C.) | OOT, K |
|---|---|---|---|
| Sample 1, after 6 h at 400° C. (Sample 8) | | | |
| 30 | 0.5 | 213 | 486 |
| 10 | 0.166667 | 199.3 | 472.3 |
| 5 | 0.083333 | 191 | 464 |
| 2 | 0.033333 | 179 | 452 |
| Sample 1 (Feed) | | | |
| 30 | 0.5 | 273 | 546 |
| 10 | 0.166667 | 252 | 525 |
| 5 | 0.083333 | 245 | 518 |
| 2 | 0.033333 | 222 | 495 |
| A ($s^{-1}$) | | Ea (kJ/mol) | |
| Sample 1, after 6 h at 400° C. (Sample 8) | | | |
| 2.33083E+15 | | 145.9112 | |
| Sample 1 (Feed) | | | |
| 1.51674E+11 | | 120.4438 | |

Figure 3:
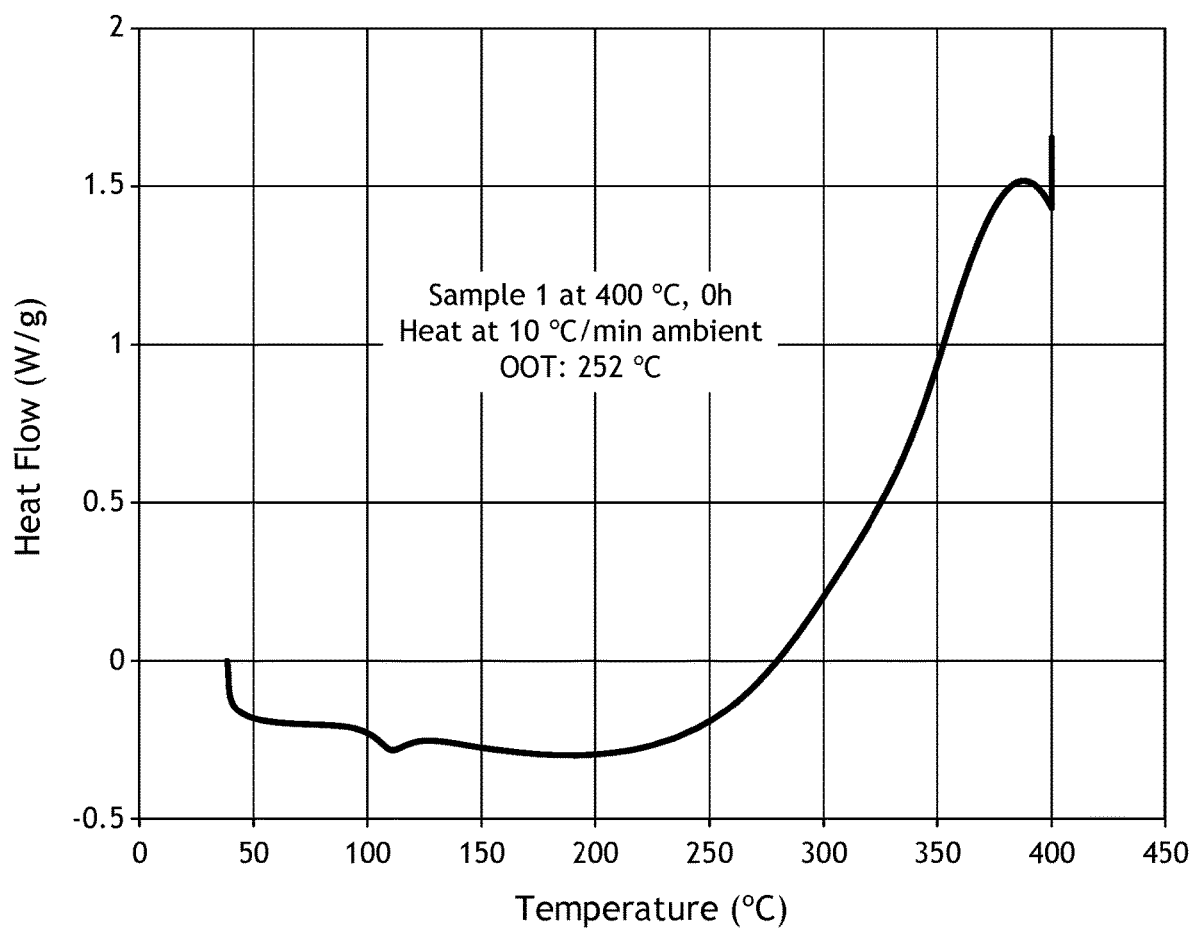
FIG. 3 is a differential scanning calorimetry (DSC) curve of heat flow (W/g) versus the temperature (° C.) of a pitch run in an open pan under air.
Figure 4A:
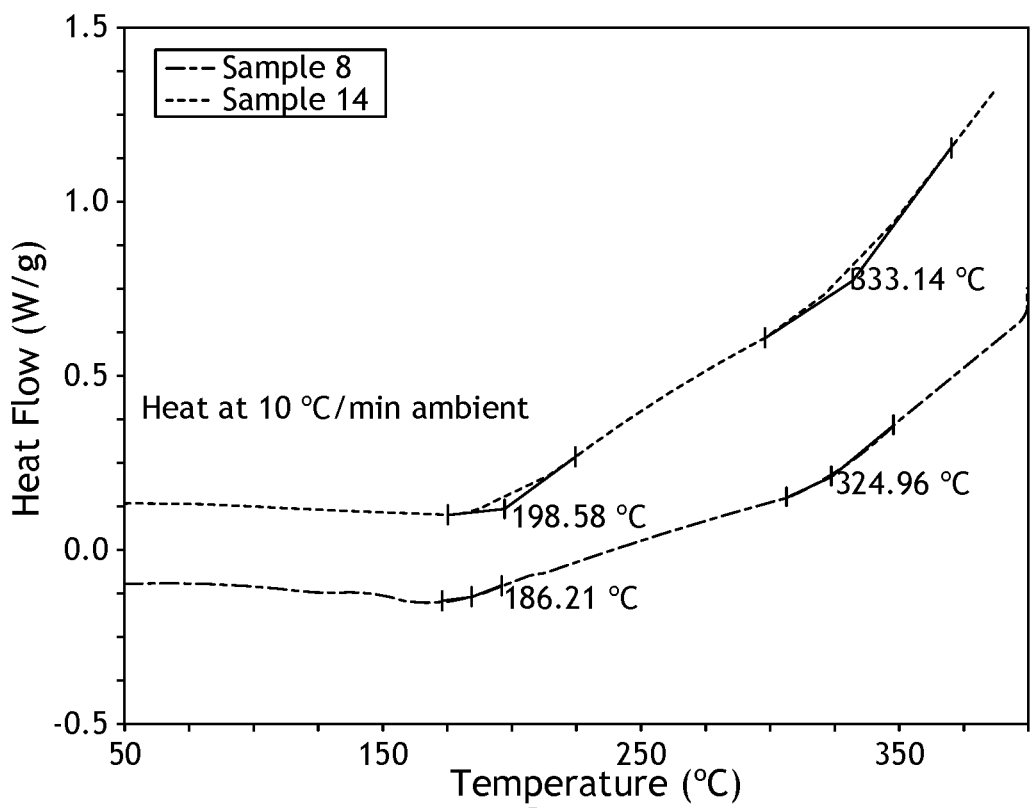
FIG. 4A is a differential scanning calorimetry (DSC) curve of heat flow (W/g) versus the temperature (° C.) of various pitches run in an open pan under air.
Figure 4B:
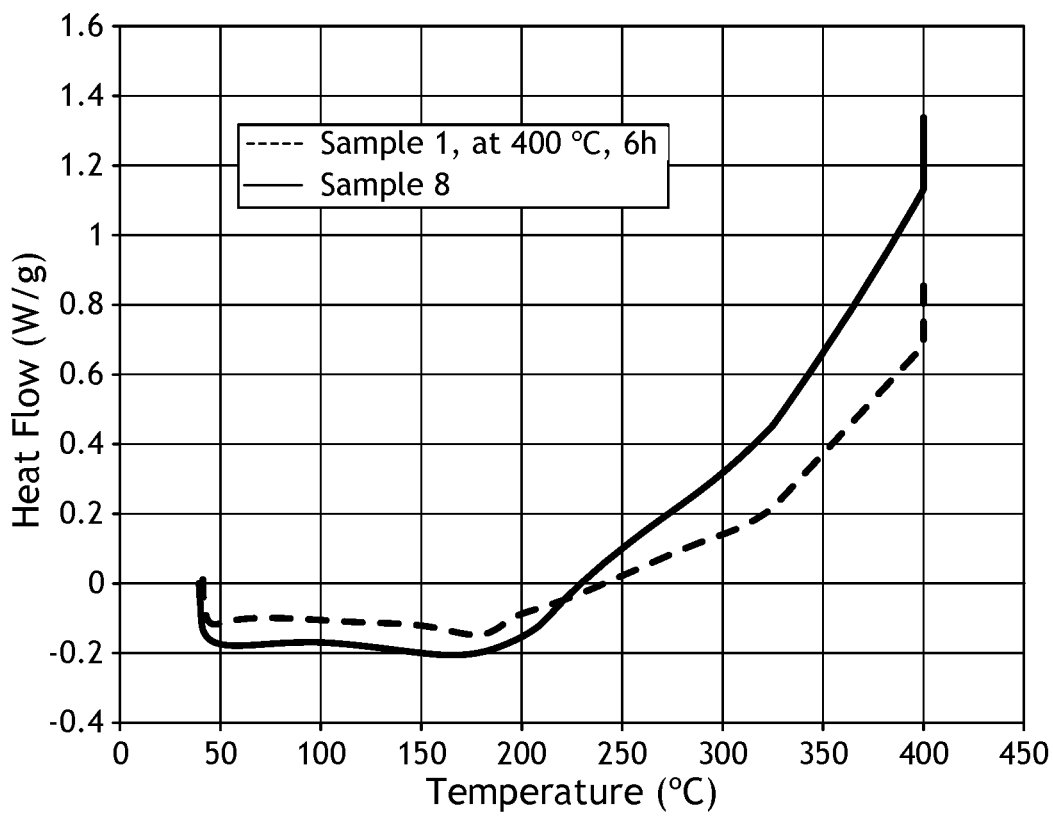
FIG. 4B is a differential scanning calorimetry (DSC) curve of heat flow (W/g) versus the temperature (° C.) of various pitches run in an open pan under air.

FIGS. 3, 4A, and 4B illustrate the differential scanning calorimetry (DSC) curve of various pitch samples (e.g., Samples 1, 8, 14), which depict the variation of heat flow (W/g) as function of the temperature (° C.) of the pitch run in an open pan, under air. The onset of oxidation was reflected by the sudden release of heat at this temperature, which was due to the chemical reaction of the pitch with air. Regarding Sample 1 (see Table 1 and FIG. 3), the onset of oxidation occurred at an OOT1 of about 252° C. The $T_{sp}$ of Sample 1 was 170° C., which indicated that the pitch (Sample 1) would have melted prior to reacting with air (which is at the temperature of 252° C.). Such results showed that Sample 1 would not be a suitable pitch for spinning into carbon fiber since the quality of the said carbon fiber would have been compromised during the stabilization process.

Regarding Samples 8 and 14 (see Table 1 and FIG. 4A), the $T_{sp}$ of Sample 8 was 313.2° C., and $T_{sp}$ of Sample 14 was 323.2° C. Notwithstanding, the DSC curve of Samples 8 and 14 depicted two heat release events. Indeed, as showed in Table 1 and FIG. 4A, the onsets of oxidation of Sample 8 occurred at an OOT1 of about 186° C., and an OOT2 of about 325° C., whereas the onsets of oxidation of Sample 14 occurred at an OOT1 of about 198° C., and an OOT2 of about 333° C. For both samples, the value of the difference $T_{sp}$–OOT1 (° C.) was positive, indicating that the integrity of the carbon fiber would not be lost during the stabilization process. Again, the onset of oxidation was reflected by the sudden release of heat at the described temperatures, due to the exothermic reaction of the pitches (Samples 8 and 14) with air. Without being bond by any theory, the second heat release (OOT2) is believed to be due to the reaction between the mesophase pitch and the oxygen of air. Therefore, for a particular pitch, and at a particular heat ramp rate (e.g., 10° C./min), the exothermic reaction with air will occur at a particular temperature for which the onset of oxidation will take place. FIG. 4B is a differential scanning calorimetry (DSC) curve of heat flow (W/g) versus the temperature (° C.) of Samples 1 and 8 ran in an open pan under air.

Figure 5:
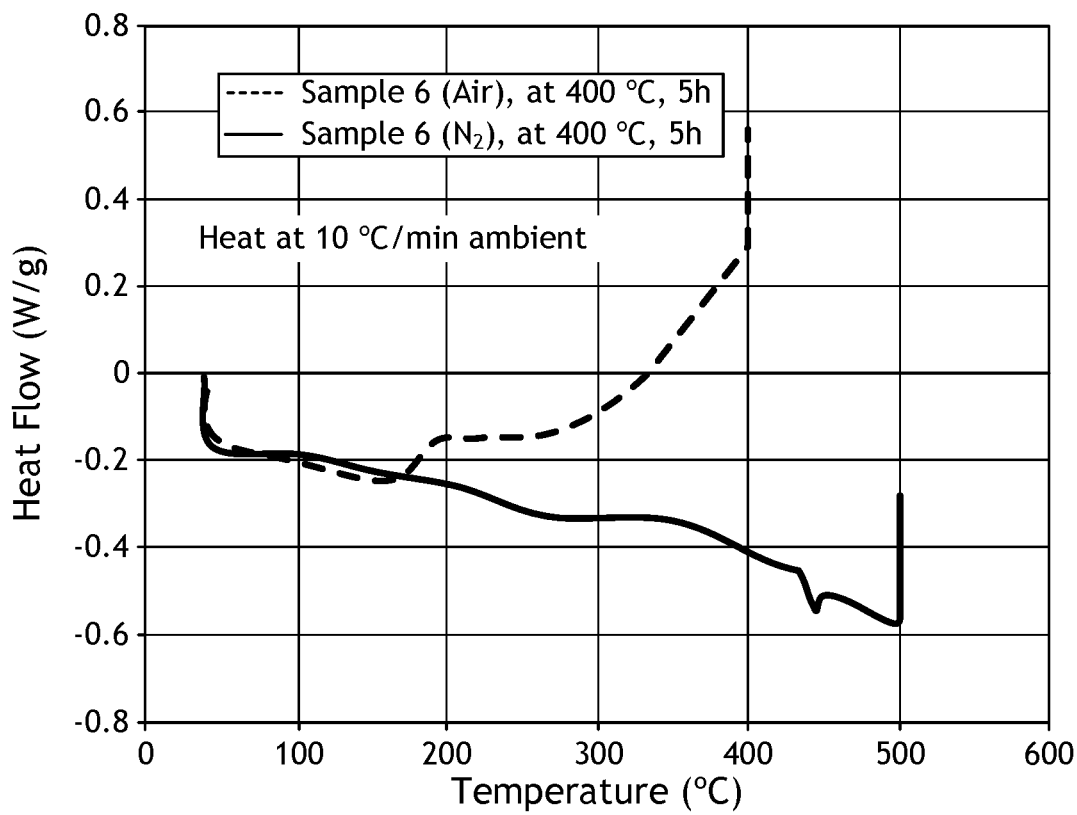
FIG. 5 is a differential scanning calorimetry (DSC) curve of heat flow (W/g) versus the temperature (° C.) of a pitch run in an open pan under air, and under nitrogen.

The effect of the oxygen (air) on the heat release of a pitch was further demonstrated in FIG. 5 by a control experiment, wherein DSC measurements carried out under air were compared to the DSC measurements carried out under nitrogen. FIG. 5 illustrates a DSC curve of heat flow (W/g) versus the temperature (° C.) of a pitch (Sample 6) run in an open pan under air compared to a DSC curve of heat flow (W/g) versus the temperature (° C.) of the same pitch (Sample 6) under nitrogen. The DSC measurements clearly demonstrated that the heat was due to the reaction of pitch with the air (Sample 6). If the heat release events were due to the oligomerization of reactive olefins, then the heat release would be expected to occur under nitrogen. However, under nitrogen, no heat release occurred. Thus, the DSC measurements provided insight on how the pitch would respond during the stabilization process.

Figure 6:
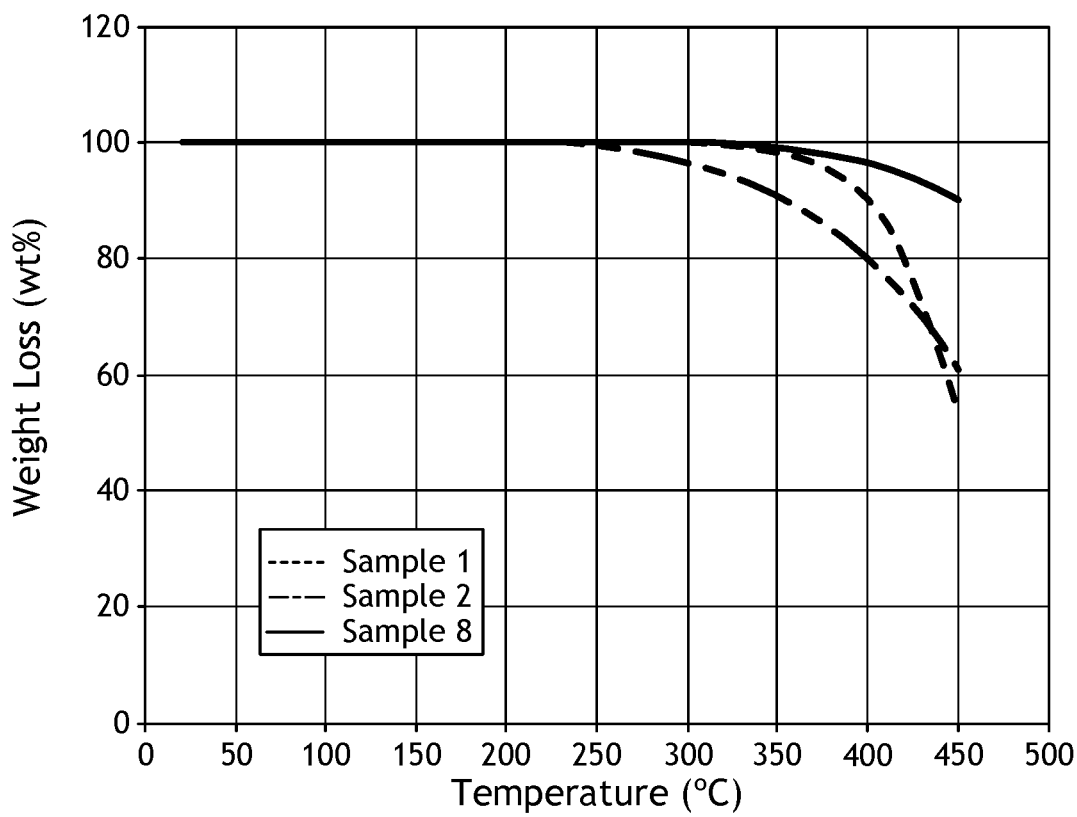
FIG. 6 is a thermal gravimetric analysis (TGA) graph illustrating the weight loss versus the temperature (° C.) of various pitches.
Figure 7:
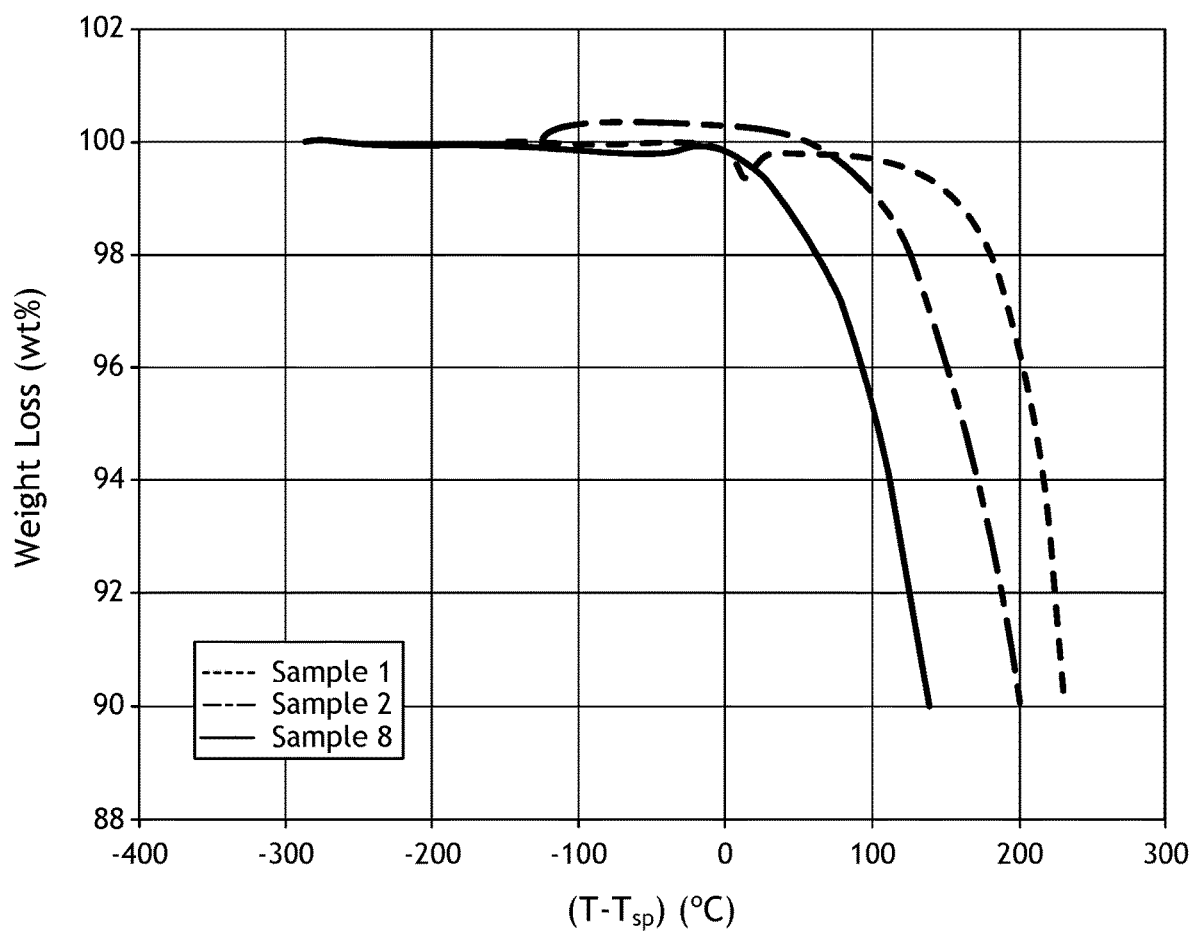
FIG. 7 is a thermal gravimetric analysis (TGA) graph illustrating the weight loss versus the temperature difference ($\Delta T$, ° C.) between the temperature at which the volatiles form as recorded from the TGA measurement and the softening point ($T_{sp}$) for various pitches.

FIG. 6 is a thermal gravimetric analysis (TGA) graph illustrating the weight loss versus the temperature (° C.) of various pitches (e.g., Samples 1, 2, and 8). FIG. 7 is a thermal gravimetric analysis (TGA) graph illustrating the weight loss versus the temperature difference (ΔT, ° C.) between the temperature at which the volatiles form as recorded from the TGA measurement and the softening point ($T_{sp}$) for various pitches (e.g., Samples 1, 2, and 8).

FIG. 6 is a TGA graph illustrating the weight loss (wt %) versus the temperature (° C.) using a 10° C./min ramp rate for Samples 1, 2, and 8, which shows the relationship between the percent of weight change of a pitch and the increase in temperature of the pitch. Thus, FIG. 6 demonstrates the amount of volatiles as a function of temperature, whereas FIG. 7 reveals the amount of volatiles (wt %) relative to the softening point of the pitch. FIG. 7 is a TGA graph illustrating the weight loss versus the temperature difference (ΔT, ° C.) between the temperature at which the volatiles form as recorded from the TGA measurement and the softening point ($T_{sp}$) for various pitches (e.g., Samples 1, 2, and 8). Consequently, pitches with low volatiles at spinning temperatures are needed in order to prevent fiber breakage during spinning. In at least one embodiment, a pitch should be spun at a spinning temperature between $T_{sp}$–30° C. and $T_{sp}$+80° C. As shown in FIGS. 6 and 7, Samples 1 and 2 appeared to be suitable for spinning into their corresponding carbon fibers at softening point above 30° C. However, Samples 1 and 2 would not provide efficient stabilization capability to their corresponding carbon fibers. Furthermore, the results depicted in FIGS. 6 and 7 indicate that Sample 8 would be a suitable pitch which would enable the corresponding carbon fiber to do well during the stabilization process, however, the pitch would need to be spun at about 20° C. above $T_{sp}$, instead of 30° C. above $T_{sp}$.

All documents described herein are incorporated by reference for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Whenever a numerical range with a lower limit and an upper limit is disclosed, any number and any included range falling within the range is specifically disclosed, including the lower limit and upper limit. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A pitch composition suitable for spinning comprising: a pitch having a softening point temperature ($T_{sp}$) of 400° C. or less, and an oxidation onset temperature (OOT) at least 10° C. below the $T_{sp}$ at a ramp rate of 10° C./min, wherein the pitch comprises a mesophase content of more than 5 vol %, based on the total volume of the pitch.

2. The pitch composition of claim 1, wherein the pitch has a volatiles content of 1 wt % or less, based on the total weight of the pitch, at spinning temperature.

3. The pitch composition of claim 1, wherein the pitch has a second OOT in the range of about 200° C. to 400° C.

4. The pitch composition of claim 1, wherein the pitch has a maximum critical stress of from 100 Pa to 10,000,000 Pa at spinning temperature, and/or at an extensional strain rate ranging from 0 to 100 $s^{-1}$.

* * * * *